(12) United States Patent
Ohmori et al.

(10) Patent No.: US 8,785,772 B2
(45) Date of Patent: Jul. 22, 2014

(54) TERMINAL BOX AND TERMINAL BOX FIXING ARRANGEMENT

(75) Inventors: Yasuhiro Ohmori, Osaka (JP); Toshiya Tanaka, Kashiba (JP)

(73) Assignee: Hosiden Corporation, Osaka (JP)

( * ) Notice: Subject to any disclaimer, the term of this patent is extended or adjusted under 35 U.S.C. 154(b) by 63 days.

(21) Appl. No.: 13/547,391

(22) Filed: Jul. 12, 2012

(65) Prior Publication Data
US 2013/0178083 A1 Jul. 11, 2013

(30) Foreign Application Priority Data

Jul. 15, 2011 (JP) .................................. 2011-156883
Aug. 29, 2011 (JP) .................................. 2011-186540

(51) Int. Cl.
*H02G 3/08* (2006.01)
(52) U.S. Cl.
USPC ................. 174/50; 17/520; 248/906; 361/600
(58) Field of Classification Search
USPC ........... 174/50, 50.52, 520; 439/188, 367, 86; 248/906; 361/600
See application file for complete search history.

(56) References Cited

U.S. PATENT DOCUMENTS 6,659,792 B2* 12/2003 Saka et al. .................... 439/367
8,476,540 B2* 7/2013 Dahl et al. .................... 174/520

FOREIGN PATENT DOCUMENTS

JP 201114466 A 1/2011

* cited by examiner

*Primary Examiner* — Dhirubhai R Patel
(74) *Attorney, Agent, or Firm* — The Webb Law Firm

(57) ABSTRACT

A terminal box includes a box body having a bottom portion, a terminal portion fixed to the box body, a pressing portion, a holding portion and a slide mechanism The bottom portion has an opening portion capable of receiving a terminal inserted therein from the outside. The terminal portion is capable of establishing electric conduction between the terminal portion and the terminal upon contact therewith. The pressing portion is switchable between a contacting state in which the pressing portion clamps the terminal with the terminal portion for establishing electric conduction between the terminal portion and the terminal and a spaced state spaced apart from the terminal portion. The holding portion holds the pressing portion integrally and is slidable on the box body in the direction of movement of the pressing portion to/away from the terminal portion.

15 Claims, 21 Drawing Sheets

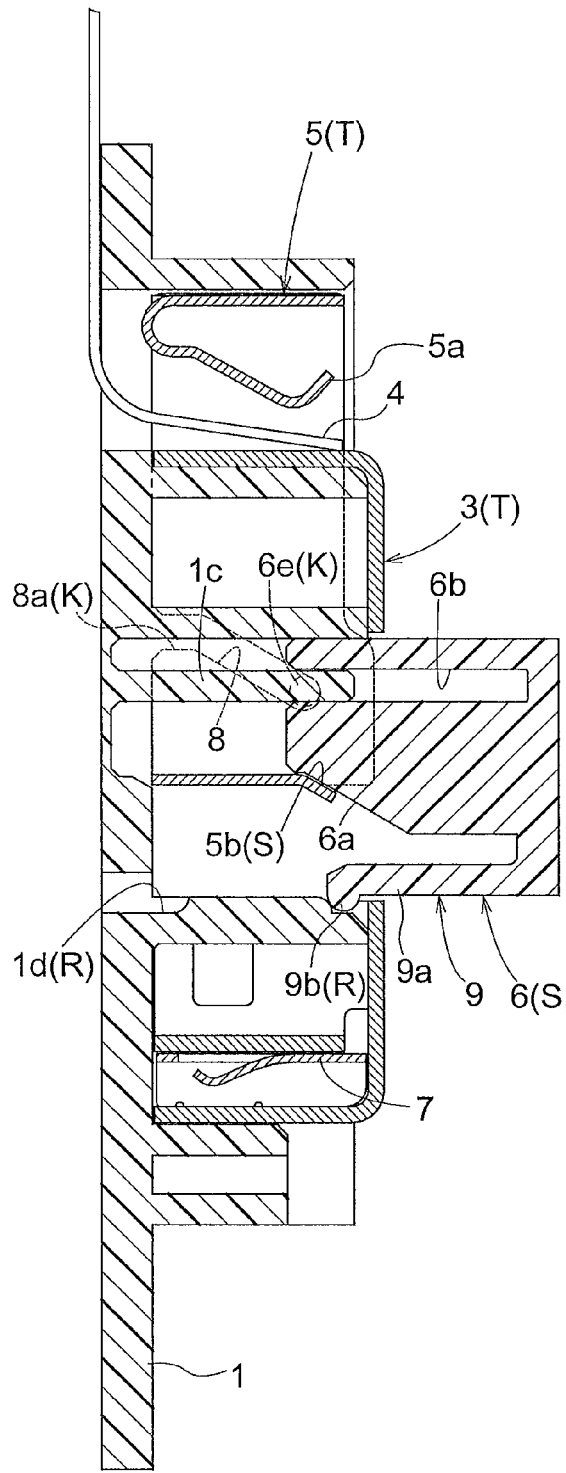
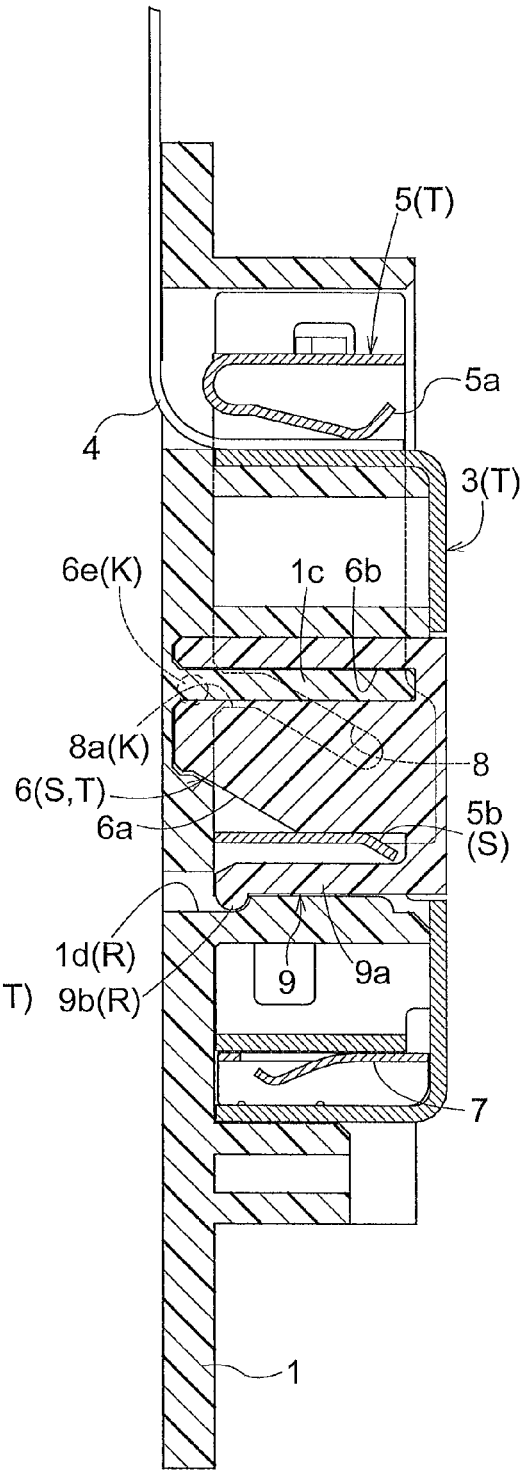

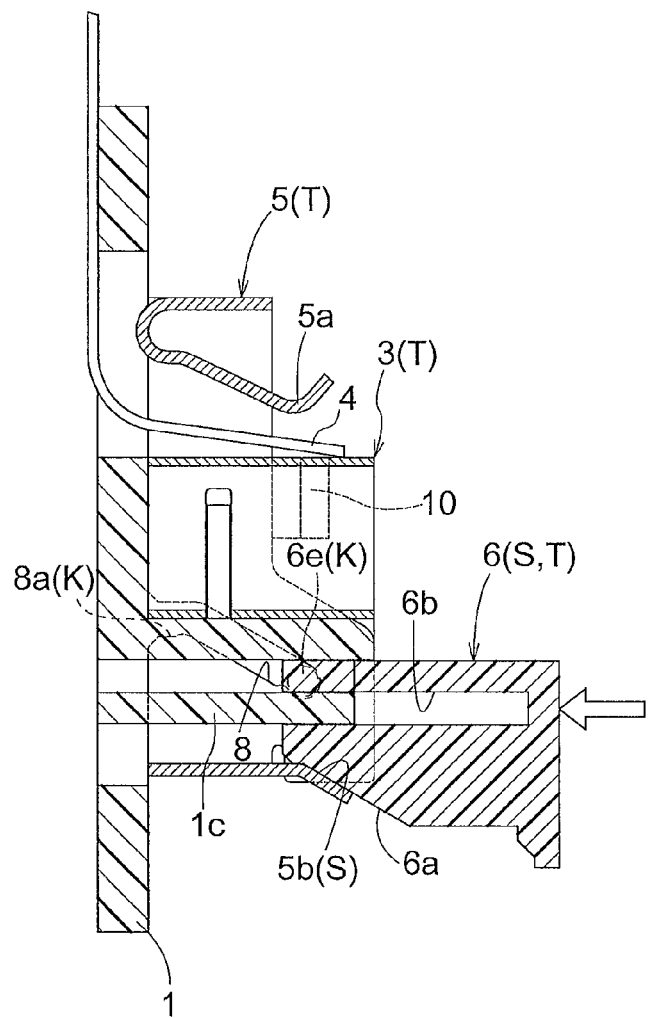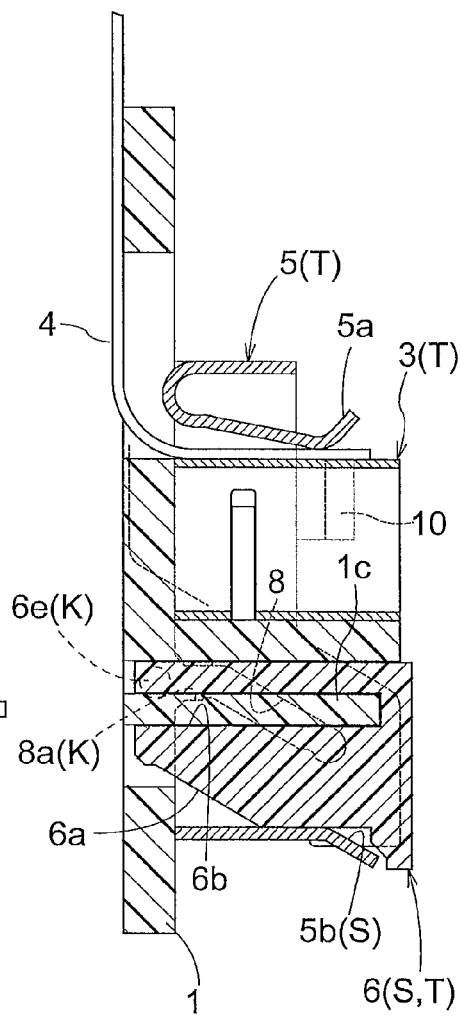

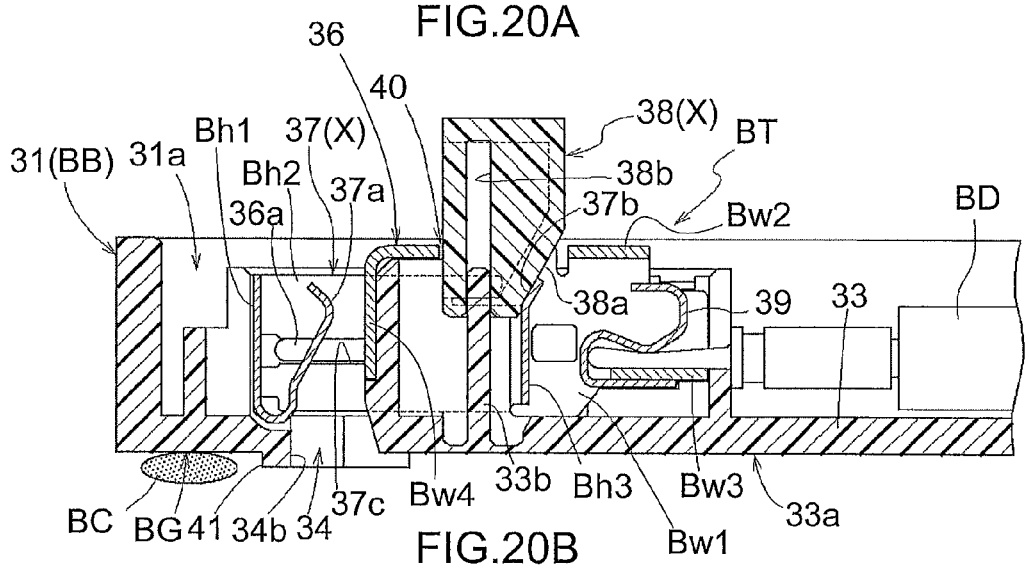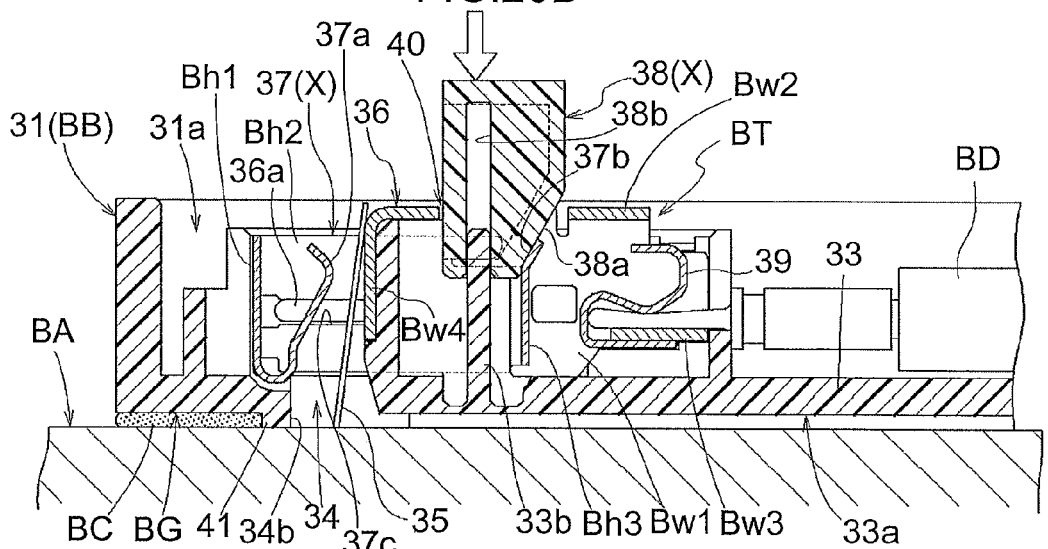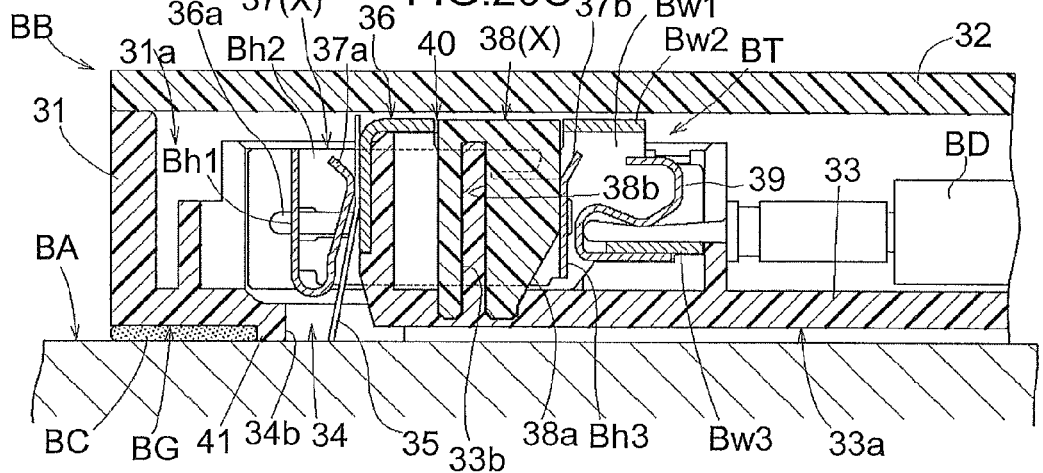

TERMINAL BOX AND TERMINAL BOX FIXING ARRANGEMENT

BACKGROUND OF THE INVENTION

1. Field of the Invention

The present invention relates to a terminal box including a box body having a bottom portion, a terminal portion fixed to the box body, a pressing portion, a holding portion, and a slide mechanism, wherein the bottom portion has an opening portion capable of receiving a terminal inserted therein from the outside, the terminal portion is capable of establishing electric conduction between the terminal portion and the terminal upon contact therewith, the pressing portion is switchable between a contacting state in which the pressing portion clamps the terminal with the terminal portion for establishing electric conduction between the terminal portion and the terminal and a spaced state spaced from the terminal portion, the holding portion holds the pressing portion integrally and is slidable on the box body in the direction of movement of the pressing portion to/away from the terminal portion, and the slide mechanism is capable of forming the contacting state by sliding the holding portion.

The invention relates also to a fixing arrangement for a terminal box including a bottom plate, an opening portion, and a terminal portion, wherein the bottom plate includes a bottom face fixed to a fixed face with an adhesive agent, the opening portion is formed in the bottom plate for use in connection of an external terminal, the terminal portion is electrically connected to the external terminal, and the external terminal and the terminal portion are connected to each other via the opening portion.

2. Description of the Related Art

Conventionally, a terminal box of the above-noted type, as shown in FIG. 14, is comprised of a square-shaped, metal vertical tube member 20 formed integral with the box body 1 and an insertion member (corresponding to "a holding portion") 21 which is inserted into the interior of the vertical tube member 20 from above (see e.g. Japanese Unexamined Patent Application Publication No. 2011-14466). With this terminal box, one perimeter face portion 20a of four perimeter faces of the vertical tube member 20 is constructed as a terminal portion 22. Further, two perimeter face portions 20b, 20c adjacent to this terminal portion 22 are constructed as lateral wall portions 23 having the function of guiding the insertion member 21 to the terminal portion 22 (slide mechanism).

The insertion member 21 is comprised of a vertically disposed groove-shaped member and its bottom face portion 21a corresponding to the groove bottom of the three perimeter faces includes an inclined face portion 21b bent as being folded from the lower edge portion toward the space inside the groove. This inclined face portion 21b is elastically pivotable along the groove depth direction and functions as a pressing portion 24 by clamping the terminal 4 together with the terminal portion 22 of the vertical tube member 20 for establishing electric conduction. The slide mechanism S includes a pair of upper and lower slots 25 formed with inclination in opposed lateral wall portions 23 of the vertical tube member 20 and a pair of upper and lower rod members 21d extending through the opposed lateral face portions 21c of the insertion member 21. The slots 25 are formed to be inclined downward as approaching the terminal portion 22. The rod members 21d are disposed with the terminal ends thereof projecting from the opposed lateral face portions 21c of the insertion member 21, so that these projecting end portions 26 may be engaged within the slots 25 of the vertical tube member 20.

Therefore, when the insertion member 21 is mounted to the vertical tube member 20 with the projecting end portions 26 being engaged within the slots 25 and then the insertion member 21 is pressed toward the lower end of the inner space of the vertical tube member 20, the projecting end portions 26 in point-contact with the inner perimeter portions 25a of the slots 25 are guided obliquely downward along the longitudinal direction of the slots 25. Hence, with pressing operation of the insertion members 21, the pressing portion 24 will be moved toward the terminal portion 22 to provide an elastic urging force, and clamp the terminal 4 together with the terminal portion 22, whereby electric connection can be established between the terminal portion 22 and the terminal 4.

According to the conventional terminal box described above, in association with insertion of the insertion members to the vertical tube member, a guiding action by the slide mechanism is provided, and electric connection can be established by the pressing portion between the terminal portion and the terminal. However, since the slide mechanism is comprised of the slots formed in the lateral wall portions of the vertical tube member and the rod members of the insertion members, the insertion force transmitted from the rod members will act on the single point of contact portion of the slot inner perimeter portion, so that there is the risk of stress concentration. As a result, there is the possibility of e.g. deformation of the contacted portion of the slot inner perimeter portion, so smooth operation of the insertion member was not possible.

Therefore, the object of the present invention is to provide a terminal box which overcomes the above-described problem and allows a smooth terminal connecting operation.

Further, with the conventional terminal box fixing arrangement, the fixed face and the bottom face of the terminal box to be fixed to this fixed face with adhesive are formed as flat faces which are flat over the entire surfaces thereof (see e.g. Japanese Unexamined Patent Application Publication No. 2011-14466).

For this reason, when unhardened adhesive agent is applied to the fixed face or the bottom face of the terminal box and then the fixed face and the bottom face are attached to each other, there is the risk of an excessive amount of adhesive agent oozed out from between the fixed face and the bottom face coming into the opening inadvertently. If this adhesive agent entering the opening portion adheres to the external terminal or the terminal portion, an electric connection failure may develop between the external terminal and the terminal portion. Further, in case the terminal box includes a movable operational member switchable between a connecting state and a non-connecting state between the terminal portion and the external terminal., if the adhesive agent entering the opening portion sticks to this movable operational member and then hardens thereon, the operation of the movable operational member may become difficult.

In order to overcome the above-described problem, it is conceivable to e.g. reduce the application amount of the adhesive agent or to increase the distance to be set between the application area of the adhesive agent on the fixed face or the bottom face and the perimeter edge of the opening portion so as to prevent the adhesive agent oozed out between the fixed face and the bottom face from reaching the opening portion. With these measures, however, there arises the possibility of reduction in the bonding strength.

In view of the above-described state of the art, the object of the present invention is to provide a terminal box fixing arrangement that allows prevention of entrance of excess adhesive agent into the opening portion while ensuring the bonding strength with a sufficient amount of adhesive agent.

SUMMARY OF THE INVENTION

According to the characterizing feature of the present invention, a terminal box comprises:
 a box body having a bottom portion;
 a terminal portion fixed to the box body;
 a pressing portion;
 a holding portion; and
 a slide mechanism;
 wherein the bottom portion has an opening portion capable of receiving a terminal inserted therein from the outside;
 the terminal portion is capable of establishing electric conduction between the terminal portion and the terminal upon contact therewith;
 the pressing portion is switchable between a contacting state in which the pressing portion clamps the terminal with the terminal portion for establishing electric conduction between the terminal portion and the terminal and a spaced state spaced apart from the terminal portion;
 the holding portion holds the pressing portion integrally and is slidable on the box body in the direction of movement of the pressing portion to/away from the terminal portion;
 the slide mechanism is capable of forming the contacting state by sliding the holding portion, the slide mechanism including a wedge-like member having an inclined wedge face and a pressure receiving face formed in the holding portion;
 the wedge-like member guides the holding portion to the contacting state by causing the inclined wedge face to slidably enter the holding portion while ensuring a reaction force in the box body; and
 the pressure receiving face receives the inclined wedge face through face-contact therewith.

According to the above arrangement, the slide mechanism is comprised of a wedge-like member that guides the holding portion to the contacting state by causing the inclined wedge face to slidably enter the holding portion while ensuring a reaction force in the box body and a pressure receiving face that receives the inclined wedge face through face-contact therewith. Therefore, the connecting operation of the terminal is possible by sliding the wedge-like member, with keeping the face contact state between the inclined wedge face of the wedge-like member and the pressure receiving face of the holding portion. As a result, in comparison with the conventional arrangement in which the operation of the slide mechanism is effected by relying only on the point contact between the rod member and the slot inner perimeter portion, the operational force can be transmitted in distribution over the large contact face as a whole. For this reason, the smooth sliding movement of the holding portion is made possible. As a result, the connecting operation of the terminal can be carried out smoothly.

According to one preferred embodiment of the present invention, there is provided a maintaining mechanism for maintaining the contacting state of the pressing portion.

With the present invention, the pressing portion can be pressed against the contact portion by the slide mechanism. Under this state, the reaction force to the pressing of the pressing portion is applied to the wedge-like member. So, there is the possibility of inadvertent disengagement of the wedge-like member. With the above-described inventive arrangement, as a maintaining mechanism is provided, such inadvertent disengagement of the wedge-like member can be prevented. Therefore, the contacting state in which the terminal is pressed against the terminal portion by the pressing portion can be maintained.

According to another preferred embodiment of the present invention, the maintaining mechanism includes a first vertical wall portion formed at a terminal end of the inclined wedge face of the wedge-like member and a second vertical wall portion that is formed at a terminal end face of the pressure receiving face of the holding portion and comes into face-contact with the first vertical wall portion.

With the above-described arrangement in operation, as the wedge-like member is slid along the inclined wedge face thereof on the pressure receiving face of the holding portion, after the respective terminal ends have overridden each other, the first vertical wall portion of the wedge-like member and the second vertical wall portion of the holding portion will come into contact with each other in lateral opposition. Therefore, the pressing reaction force of the pressing portion can be received as a drag force in the mutual opposing direction of the two vertical wall portions. Hence, despite its simple arrangement, the contacting state can be maintained effectively.

According to another preferred embodiment of the present invention, the maintaining mechanism comprises a lock mechanism for preventing inadvertent disengagement of the wedge-like member.

With the above-described arrangement, with the locking action of the lock mechanism, inadvertent disengagement of the wedge-like member can be prevented in a reliable manner.

According to still another preferred embodiment of the present invention, the maintaining mechanism comprises a cover member attached to the box body for preventing inadvertent disengagement of the wedge-like member.

With the above-described arrangement, the cover member firstly provides its original function of covering the box body for its shielding. And, the cover member can provide also another function of preventing inadvertent disengagement of the wedge-like member. Therefore, even if a strong vibration or shock is applied to the terminal box, inadvertent disengagement of the wedge-like member can be prevented by the cover member. Further, as the cover member can provide its functions, there is no need to provide any maintaining mechanism of a special construction, so that cost reduction is made possible. Moreover, if another maintaining mechanism is employed in combination, the reliability of inadvertent disengagement prevention of the wedge-like member can be further enhanced.

According to a still further preferred embodiment of the present invention, there is provided a rail member mounted erect on the box body, and the wedge-like member is engaged with the rail member to be movable along the longitudinal direction of the rail member.

With the above-described arrangement, when the wedge-like member is to be moved, the wedge-like member can be smoothly and accurately moved along the rail member, so that the operability is improved. Further, as the moving posture is stabilized, the face contacting state between the inclined wedge face of the wedge-like member and the pressure receiving face of the holding portion provided by the slide mechanism can be maintained more accurately. So that, the holding portion can be slid smoothly and easily, whereby the connection between the terminal and the terminal portion can be realized smoothly.

According to a still further preferred embodiment of the present invention, there is provided a floating prevention mechanism for preventing floating of the holding portion from the box body.

With the above-described arrangement, when the holding portion is to be slid relative to the box body, floating of the holding portion can be prevented by the floating prevention mechanism and the sliding movement under an even more stable posture is made possible. Therefore, as the moving posture of the holding portion is stabilized, the holding portion can be slid smoothly and easily, whereby the connection between the terminal and the terminal portion can be realized smoothly.

According to a still further preferred embodiment of the present invention, there is provided a support wall portion formed integrally with the box body and supporting the slide movement of the holding portion through sliding contact therewith; and the floating prevention mechanism includes a guide concave portion formed in a first sliding contact face between the support wall portion and the holding portion to be formed elongate in the sliding direction and an engaging convex portion formed in a second sliding contact face and engageable with the guide concave portion, the engaging convex portion having a projecting perimeter wall portion formed by a sheared face formed by embossing.

With the above-described arrangement, as the engaging convex portion is engaged within the guide concave portion, a relative movement is possible along the longitudinal direction of the guide concave portion. Therefore, a sliding movement of the holding portion on the box body is allowed. On the other hand, in the width direction of the guide concave portion, a movement is restricted by the engaging action between the guide concave portion and the engaging convex portion, so that floating displacement of the holding portion off the box body can be prevented. Further, as the projecting perimeter face portion of the engaging convex portion is configured as a sheared face formed by embossing, the corner portions of the convex are formed sharp. Hence, strong biting engagement with the guide convex portion can be ensured. Consequently, the floating displacement of the holding portion can be prevented even more reliably.

According to a still further preferred embodiment of the present invention, there is provided an urging mechanism for providing an urging force to the holding portion toward the spaced state.

With the above-described arrangement, when reliable contact condition of the pressing portion has not yet been established, the holding portion will be urged back to the spaced state by the urging mechanism. Therefore, it is possible to avoid occurrence of insufficient contact state, so that more reliable contact state can be formed.

According to a still further preferred embodiment of the present invention, the holding portion includes a pair of lateral wall portions along the opposed lateral portions of the wedge-like member, each lateral wall portion including a pair of inclined grooves, a pair of projections being provided in opposed lateral portions of the wedge-like member as being engaged within the inclined grooves.

With the above-described arrangement, as there are provided the inclined grooves of the lateral wall portions and the projections of the wedge-like member, when the wedge-like member is pulled out, the wedge-like member can be slid on the box body to be returned to its original position, with the projections coming into contact with the perimeter edge portions of the inclined grooves to render the holding portion into the spaced state.

According to the present invention, there is provided a terminal box fixing arrangement wherein:

a terminal box includes a bottom plate, an opening portion and a terminal portion;

the bottom plate includes a bottom face fixed to a fixed face with adhesive agent;

the opening portion is formed in the bottom plate;

the terminal portion is electrically connected to an external terminal;

the external terminal and the terminal portion are connected to each other via the opening portion;

at least one of the fixed face and the bottom face includes an application area to be applied with the adhesive agent; and a stepped portion is formed between the application area and a perimeter edge of the opening portion.

With the above-described arrangement, a stepped portion is formed between the application area provided in at least one of the fixed face and the bottom face to be applied with the adhesive agent and the perimeter edge of the opening portion. Therefore, even if a sufficient amount of adhesive agent is applied for bonding the fixed face and the bottom face to each other, oozing of an excessive amount of adhesive agent toward the opening portion can be prevented by the presence of the stepped portion. Therefore, with the terminal box fixing arrangement according to the invention, it is possible to ensure bonding strength with a sufficient amount of adhesive agent and to prevent entrance of excess adhesive agent toward the opening portion at the same time.

According to one preferred embodiment of the present invention, the stepped portion comprises a convex face portion formed on the bottom face and projecting therefrom.

With the above-described arrangement, flowing movement of excess adhesive agent is blocked and prevented by the convex face portion projecting from the bottom face of the terminal box, so that entrance of the excess adhesive agent to the opening portion can be effectively prevented.

According to another preferred embodiment of the present invention, the stepped portion comprises a concave face portion formed in the bottom face and formed concave relative thereto.

With the above-described arrangement, flowing movement of excess adhesive agent is accumulated within the concave face portion, so that entrance of the excess adhesive agent to the opening portion can be effectively prevented.

According to a still another preferred embodiment of the present invention, the terminal box includes a movable operational portion that can be switched over between a contacting state for placing the terminal portion and the external terminal in contact with each other and a non-contacting state for keeping the terminal portion and the external terminal out of contact from each other.

With the above-described arrangement, it is possible to avoid a situation where an operation of the movable operational portion becomes difficult when the excess adhesive agent adheres to the movable operational portion and then hardens thereon.

According to a still further preferred embodiment of the present invention, the terminal portion can be connected to the external terminal with the terminal portion being brought into pressed contact with the external terminal that faces the opening portion under a posture thereof aligned along the fixed face.

With the above-described arrangement, it is possible to prevent occurrence of electric connection failure between the terminal portion and the external terminal due to adhesion of excess adhesive agent to the external terminal oriented along the fixed face and facing the opening portion.

BRIEF DESCRIPTION OF THE DRAWINGS

[FIG. 9A] is a section view showing the terminal box according to the third embodiment,

[FIG. 9B] is a section view showing the terminal box according to the third embodiment,

[FIG. 11A] is a section view showing the terminal box according to the fourth embodiment,

[FIG. 11B] is a section view showing the terminal box according to the fourth embodiment,

[FIG. 20A] is a section view showing a terminal box fixing arrangement prior to fixation,

[FIG. 20B] is a section view showing the terminal box fixing arrangement after fixation,

[FIG. 20C] is a section views showing a terminal box fixing arrangement and showing a state of the terminal portion of the terminal box connected to an external terminal after the fixation,

DETAILED DESCRIPTION OF THE PREFERRED EMBODIMENTS

Figure 1:
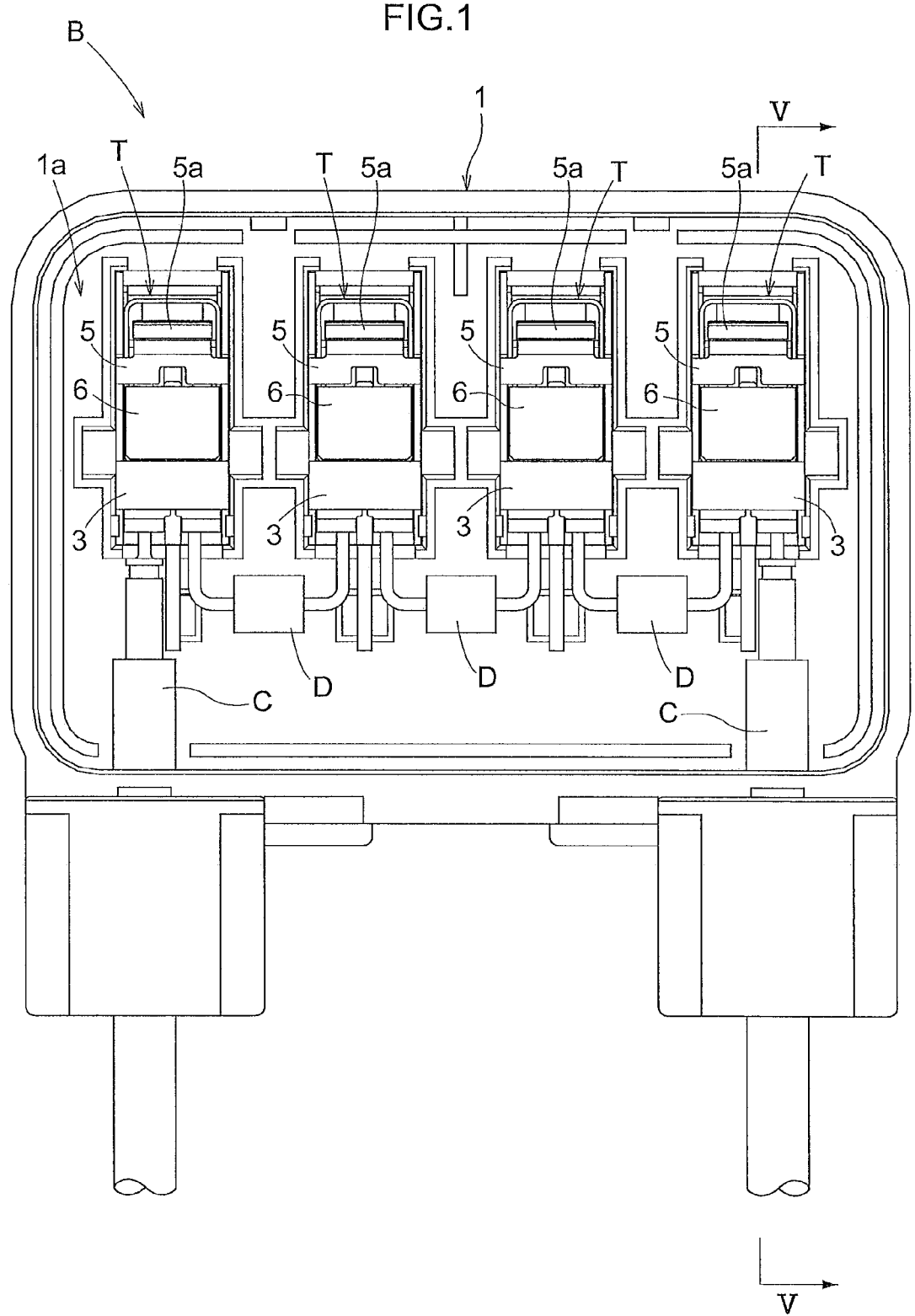
[FIG. 1] is a plane view of a terminal box according to a first embodiment.

Next, preferred embodiments of a terminal box will be explained with reference to the accompanying drawings. Incidentally, in these drawings, portions identical or corresponding to those in the prior art will be denoted with identical reference marks/numerals to the prior art. And, in the following description, the upper/lower direction refers to the upper/lower direction under the placed condition of the terminal box.

[First Embodiment]

FIG. 1, FIG. 2, FIG. 5A and FIG. 5B show a terminal box B to be mounted to a solar cell module for example. The terminal box B includes a boxlike box body 1 formed of resin and a lid body (corresponding to "a cover member") 2 formed of resin (see FIG. 5A and FIG. 5B). Inside the box body 1, there are provided terminal portions 3 to be electrically connected to solar cell modules (not shown). Further, the box body 1 includes an upper opening portion 1a, which is closed by the lid body 2.

In the bottom portion of the box body 1, there is formed a lower opening portion (corresponding to "an opening portion") 1b, in which terminal 4 (see FIG. 5A and FIG. 5B) extending from the solar cell module can be inserted. Further, inside the box body 1, there are provided a holding portion 5 and a wedge-like member 6. The holding portion 5 includes, in addition to the terminal portion 3, a pressing portion 5a configured to clamp the terminal 4 together with the terminal portion 3 for establishing electric conduction between the terminal portion 3 and the terminal 4. The wedge-like member 6 allows the holding portion 5 to be slid along the box body 1. The box body 1 is configured to be capable of accommodating therein a plurality of terminal assembly bodies T each consisting of the terminal portion 3, the holding portion 5 and the wedge-like member 6, in juxtaposition with each other. Mounting of the terminal assembly body T to the box body 1 is effected by fixing the terminal portion 3 to the box body 1.

Further, at a portion of the box body 1 corresponding to the center of the plane of the terminal assembly body T, there is mounted erect a rail portion (corresponding to "a rail member") 1c for vertically slidably supporting the wedge-like member 6. The rail portion 1c has a T-shaped cross section so as to provide a strong resistance against in both the width direction and the length direction of the terminal assembly body T. Meanwhile, adjacent terminal assembly bodies T are electrically connected via a bypass diode D. To each one of the terminal assembly bodies T disposed at the opposed ends, there is connected an output cable C connected to e.g. a battery. The following explanation will be made on a single terminal assembly T.

Figure 2:
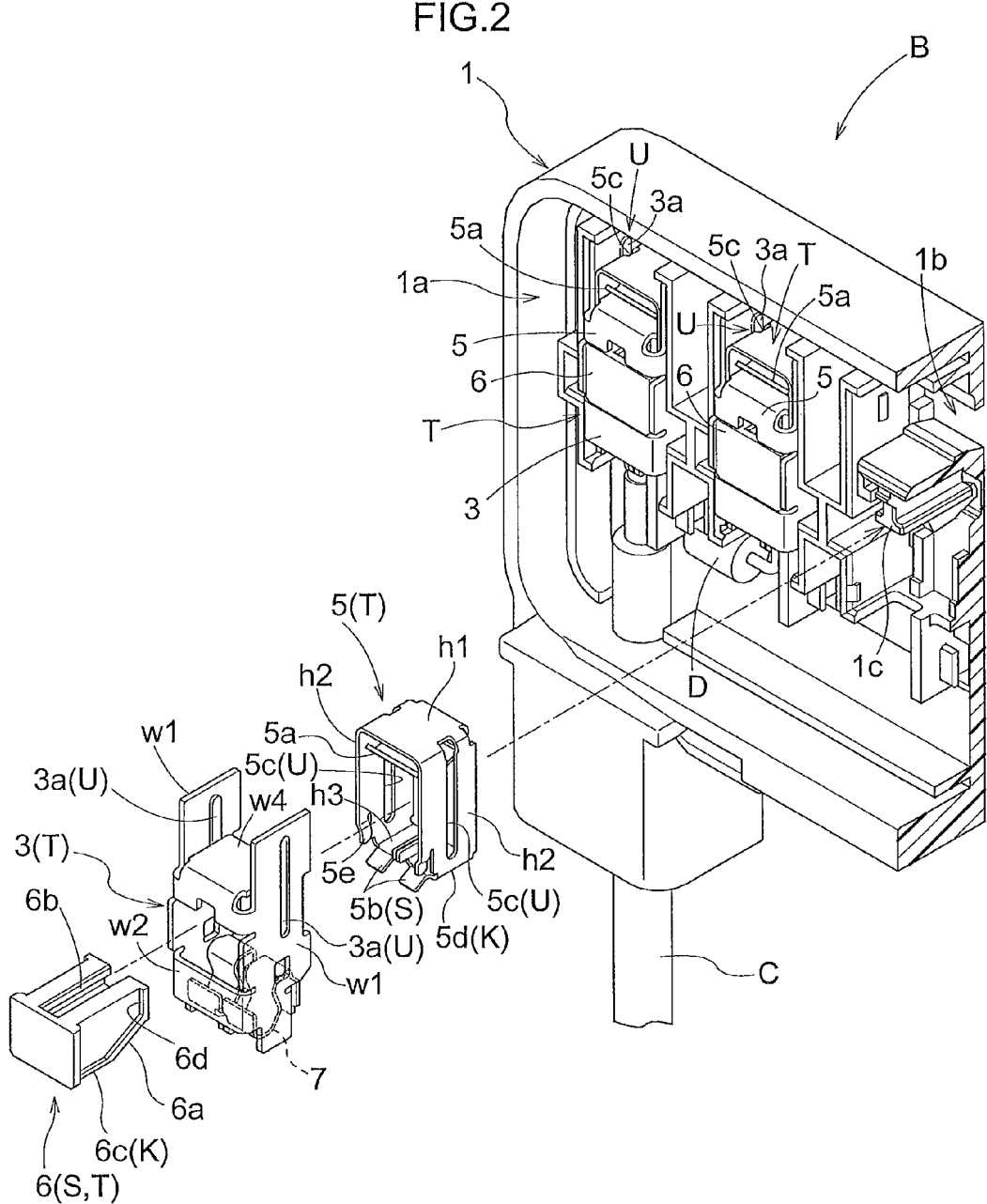
[FIG. 2] is an exploded perspective view showing principal portions of the terminal box according to the first embodiment.
Figure 3:
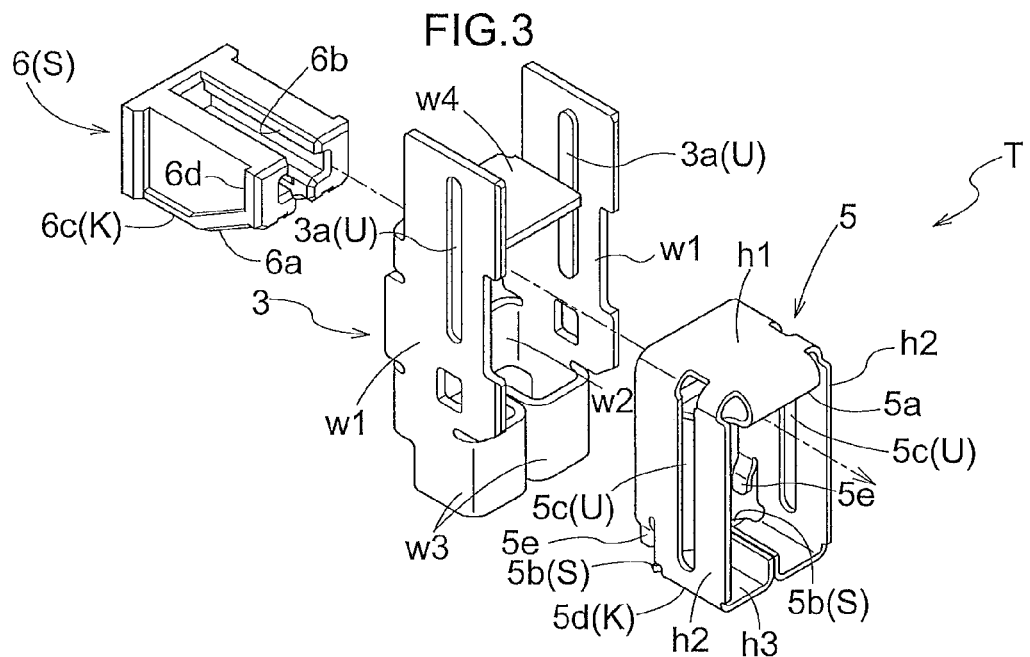
[FIG. 3] is an exploded perspective view showing a terminal assembly body according to the first embodiment.
Figure 4:
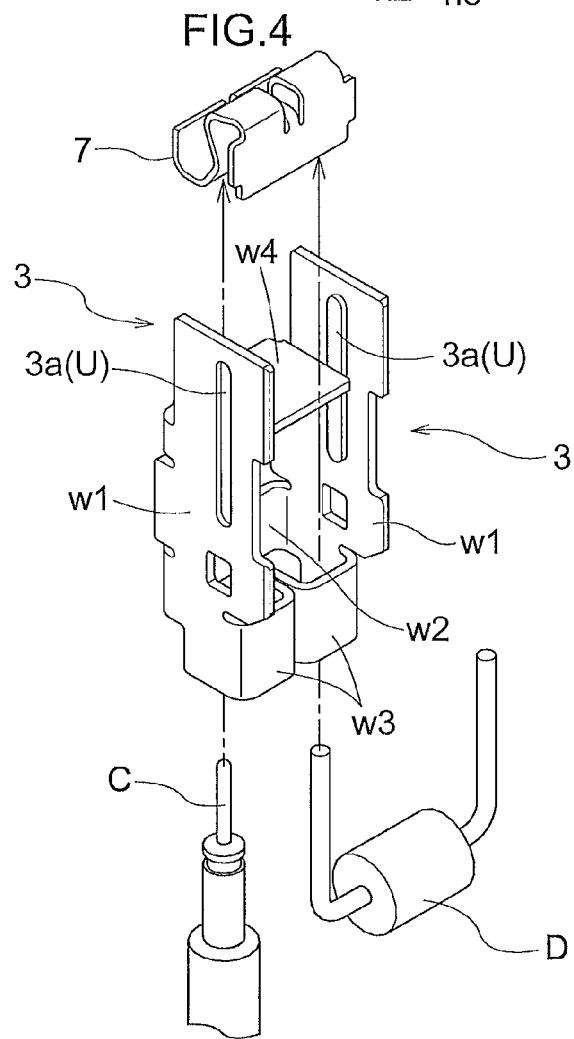
[FIG. 4] is an exploded perspective view showing the terminal assembly body according to the first embodiment.

The holding portion 5 is formed of a metal plate and as shown in FIG. 2 and FIG. 3, is formed as a rectangular tube member having four perimeter walls and rectangular end face openings. The end face of the holding portion 5 is placed on the upper face of the box body 1. The holding portion 5 is slidable on the box body 1 along the direction of the long side of the rectangle of the end face opening. Of the four perimeter walls, a first short side perimeter face portion h1 includes a pressing portion 5a formed of a bent face portion bent as being folded from the inner edge portion toward the inner hollow side. This pressing portion 5a has elasticity, so that the pressing portion 5a can be elastically pivoted about its lower edge portion as the pivotal center. As the holding portion 5 as a whole is slid to bring the pressing portion 5a closer to the terminal portion 3 side and then the holding portion 5 is further slid with the terminal 4 being interposed therebetween, the pressing portion 5a can be pressed against the terminal portion 3, whereby electric connection can be established between the terminal 4 and the terminal portion 3 (see FIG. 5A and FIG. 5B). In this way, in association with sliding movement of the pressing portion 5a, there can be selectively provided a contacting state wherein the terminal 4 is clamped between the pressing portion 5a and the terminal portion 3 for establishing electric conduction between the terminal portion 3 and the terminal 4 and a spaced state wherein the holding portion 5 (pressing portion 5a) is kept away from the terminal portion 3.

Further, at an upper edge portion of a second short side perimeter face portion h3, there is formed a pressure receiving face 5b formed as an inclined face portion inclined in the diameter increasing direction (see FIG. 2). In the instant embodiment, a pair of right and left pressure receiving portions 5b are provided. This pressure receiving portion 5b is capable of receiving an inclined wedge face 6a of the wedge-like member 6 through face-contact therewith. Further, downwardly from the lower end of the pressure receiving face 5b, there is provided a second vertical wall portion 5d formed as a vertical face.

Each one of a pair of opposed long side perimeter wall portions (corresponding to "lateral wall portions") h2 defines, at a vertical intermediate portion thereof, an elongate slot (corresponding to "a guide concave portion") 5c. This elongate slot 5c is configured to be capable of engagement therein of an engaging convex portion 3a (to be described later) provided in the terminal portion 3. The elongate slot 5c allows sliding of the engaging convex portion 3a along this elongate slot 5c. Also, regarding the vertical direction, the engagement action between the elongate slot 5c and the engaging convex portion 3a restricts movement of the engaging convex portion 3a, thereby to prevent floating displacement of the holding portion 5 off the box body 1. These components, i.e. the elongate slot 5c and the engaging convex portion 3a together constitute a floating prevention mechanism U. Further, at a portion of the upper edge of the long side perimeter face portion h2 on the side of the short side perimeter face portion h3, there is provided a cut raised portion 5e projecting toward the tubular hollow space side. As a projecting edge portion 6d of the wedge-like member 6 to be described later is received by this cut raised portion 5e, inadvertent withdrawal of the wedge-like member 6 is prevented.

The terminal portion 3 is formed of a metal plate and as shown in FIG. 3, includes three perimeter face portions covering the holding portion 5. These perimeter face portions include a pair of perimeter wall portions (corresponding to "support wall portions") w1 each of which can come into slidable contact with the one of the pair of long side perimeter wall portions h2 of the holding member 5 and a ceiling portion w2 interconnecting the upper edge portions of the two perimeter wall portions w1. The perimeter wall portion w1 defines the engaging convex portion 3a engageable within the elongate slot 5c of the holding portion 5. This engaging convex portion 3a is formed by pressing a corresponding portion of the perimeter wall portion w1 with a punching mold and stopping the pressing action before punching through the portion completely. With this method, the projecting corner portion of the engaging convex portion 3a can be finished sharp. With this, compared with a rounded projecting corner portion for instance, inadvertent disengagement from the elongate slot 5c can be more effectively prevented. With this punching method, the outer perimeter wall portion of the engaging convex portion 3a will be formed as a "sheared face".

At the first side end portion of the perimeter wall portion w1, no ceiling portion w2 is provided. Further, at the second side end portion of the perimeter wall portion w1, there is provided an output contact portion w3 having a U-shaped cross section to which an output cable C or a bypass diode D is connected. To this output contact portion w3, there is attached a clamping body 7 for elastically and vertically clamping the output contact portion w2. With this clamping body 7, the output cable C or the bypass diode D can be clamped to the output contact portion w3, for establishing electric conduction and connection.

The ceiling portion w2 defines at the center thereof, an opening that allows passage therethrough of the wedge-like member 6 along the vertical direction. At the first side end portion of the ceiling portion w2, there is formed a suspended face portion w4 which is bent downwards. This suspended face portion w4 is arranged in opposition to the pressing portion 5a. In operation, as the pressing portion 5a approaches to come into contact with the suspended face portion w4, the suspended face portion w4 acts as a connecting terminal for establishing electric connection between the terminal 1 and the terminal portion 3 (see FIG. 5A and FIG. 5B).

The wedge-like portion 6 is formed of a synthetic resin and, as shown in FIG. 3, has a shape of a rectangular block with a lower end portion of one of its perimeter faces being chamfered obliquely. This chamfered portion constitutes the inclined wedge face 6a which comes into face-contact with the pressure receiving face 5b of the holding portion 5 for transmitting a pressing force to the holding portion 5. Further, the wedge-like portion 6 defines a rail groove 6b which outwardly engages the rail portion 1c of the box body 1. As this rail groove 6b is engaged with the rail portion 1c and the rail portion 1c is pushed down, the force is transmitted from the inclined wedge face 6a to the pressure receiving face 5b of the holding portion 5, so that the holding portion 5 entirely can be slid toward the second side. The wedge-like member 6 and the pressure receiving face 5b together constitute a slide mechanism S.

Figure 5A:
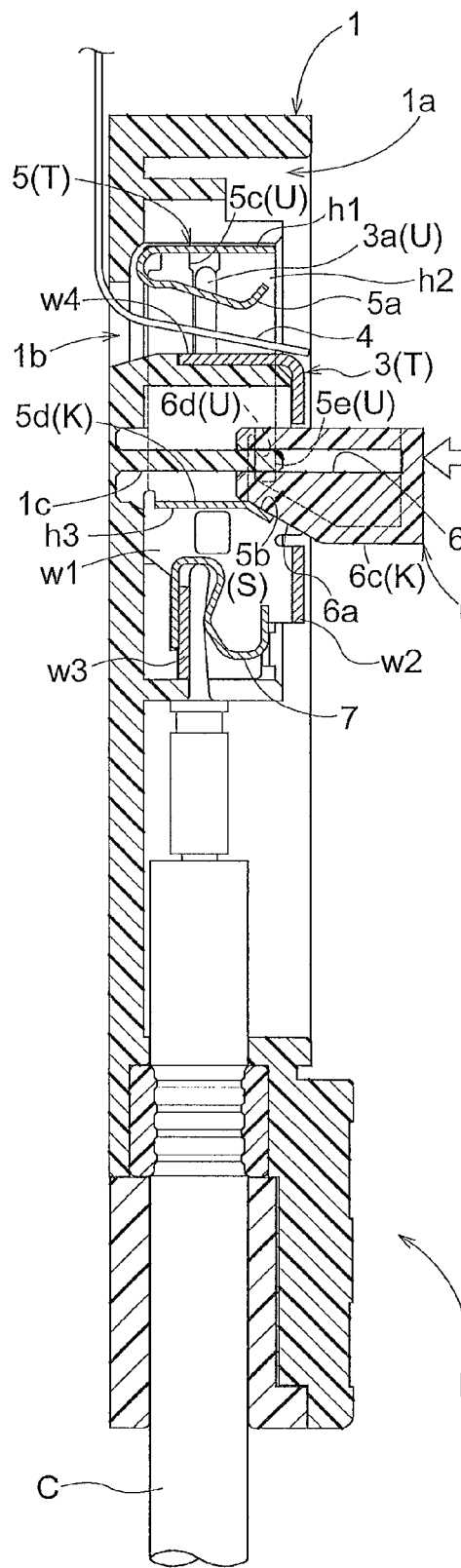
[FIG. 5A] is a section view of the terminal box according to the first embodiment.
Figure 5B:
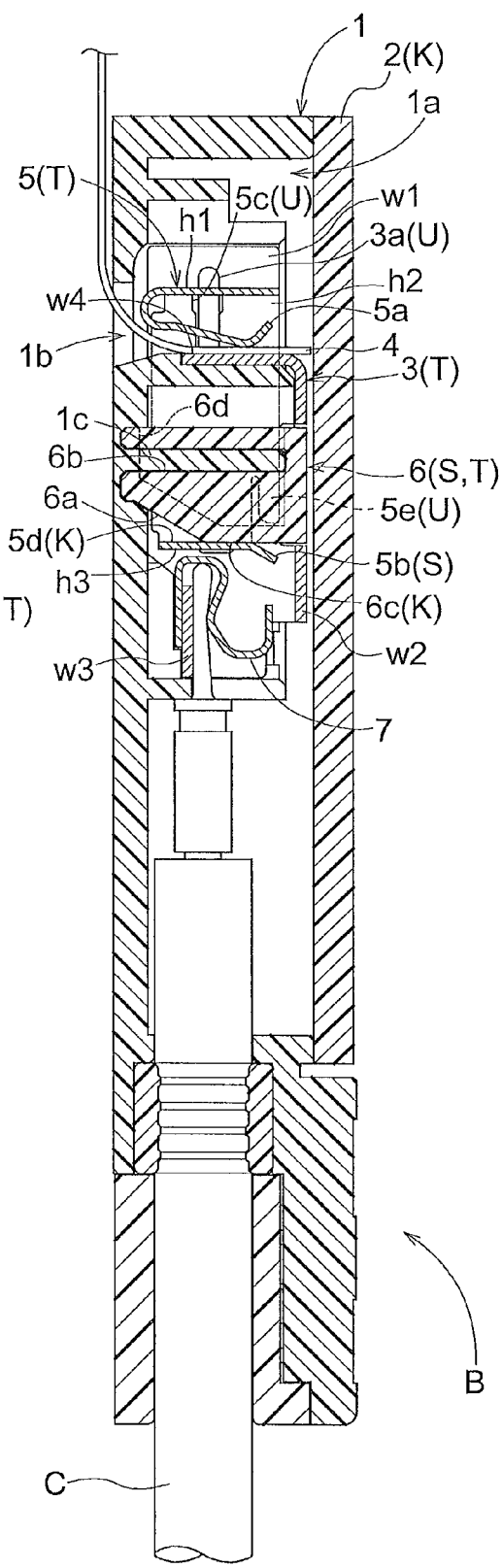
[FIG. 5B] is a section view of the terminal box according to the first embodiment.

Incidentally, upwardly of the upper end portion of the inclined wedge face 6a, there is provided a first vertical wall portion 6c as a vertical face. This first vertical wall portion 6c, as shown in FIG. 5A and FIG. 5B, comes into face contact with the second vertical wall portion 5d of the holding portion 5 after the contact between the inclined wedge face 6a and the pressure receiving face 5b in the process of the wedge-like member 6 being pushed downwards. Under this condition, the function of the slide mechanism S is completed already. Therefore, even if the wedge-like member 6 is further pushed in, no horizontal sliding of the holding portion 5 will occur and the contacting state between the pressing portion 5a and the terminal portion 3 can be maintained. This contacting state can be maintained unless the wedge-like member 6 is withdrawn. The first vertical wall portion 6c and the second vertical wall portion 5d together constitute a maintaining mechanism K.

Further, in opposed lateral faces of the wedge-like member 6, there are formed projecting edge portions 6d extending across the corner with the first vertical wall portion 6c, the corner with the inclined wedge face 6a and the corner with the lower face. As the projecting edge portions 6d come into contact with the cut raised portions 5e of the holding portion 5 from under, inadvertent disengagement of the wedge-like member 6 can be prevented.

As described above, as the wedge-like member 6 is pushed downwards, the holding portion 5 is slid to press the pressing portion 5a against the suspended face portion w4 of the terminal portion 3. With this arrangement, the inserted terminal 4 can be electrically connected to the terminal portion 3 without using a solder or the like. Further, when the lid body 2 is attached to the box body 1, the back face of the lid body 2 is positioned with forming substantially no gap relative to the upper face of the wedge-like member 6. Hence, inadvertent disengagement of the wedge-like member 6 can be prevented by the lid body 2. This lid body 2 too is a constituent of the maintaining mechanism K.

[Second Embodiment]

Next, an embodiment of the terminal box having a different configuration from that of the foregoing embodiment will be described mainly about its different arrangements. Explanation of the identical arrangements as those of the forgoing embodiment will be omitted.

Figure 6:
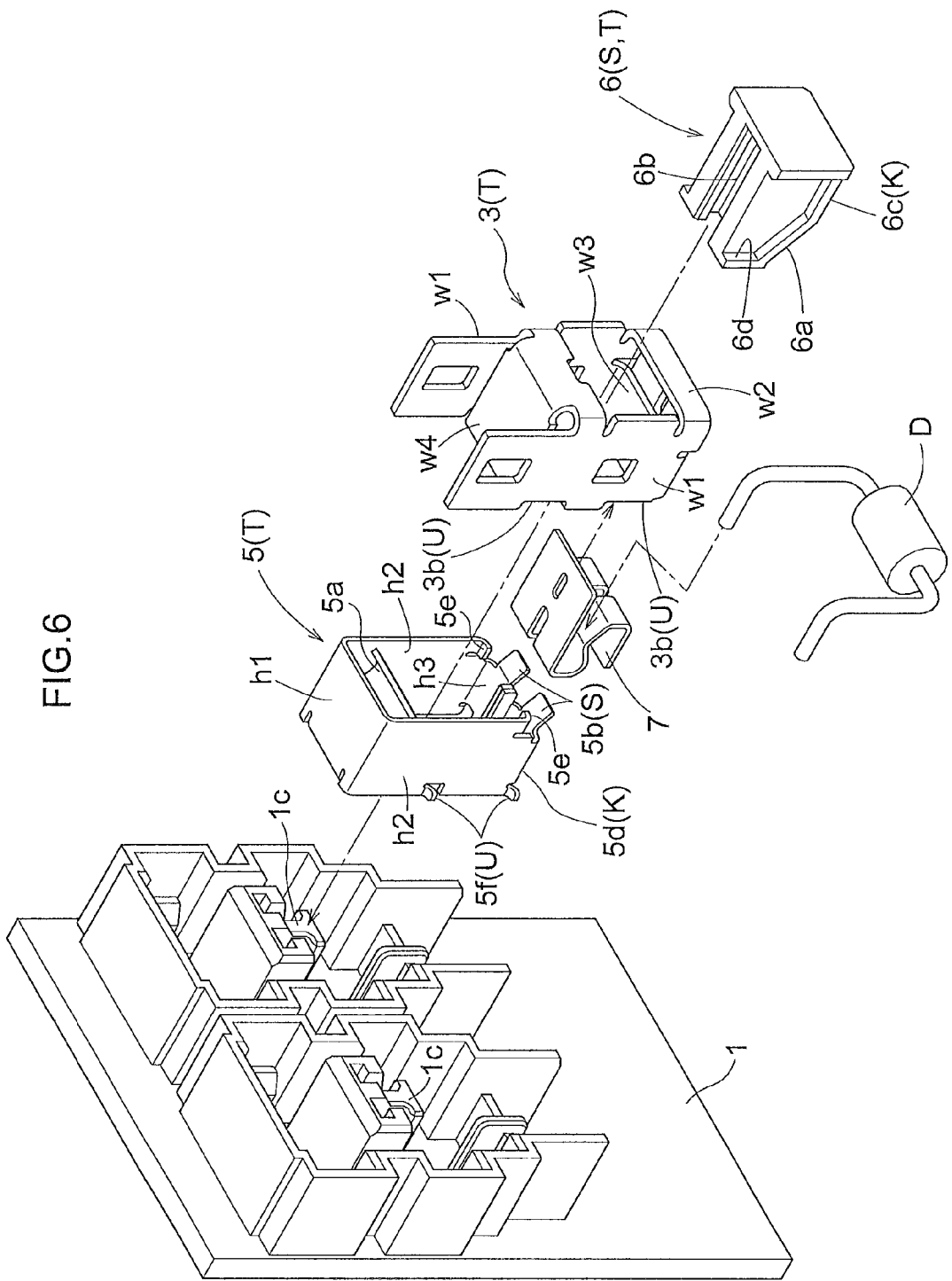
[FIG. 6] is an exploded perspective view showing a terminal box according to a second embodiment.
Figure 7A:
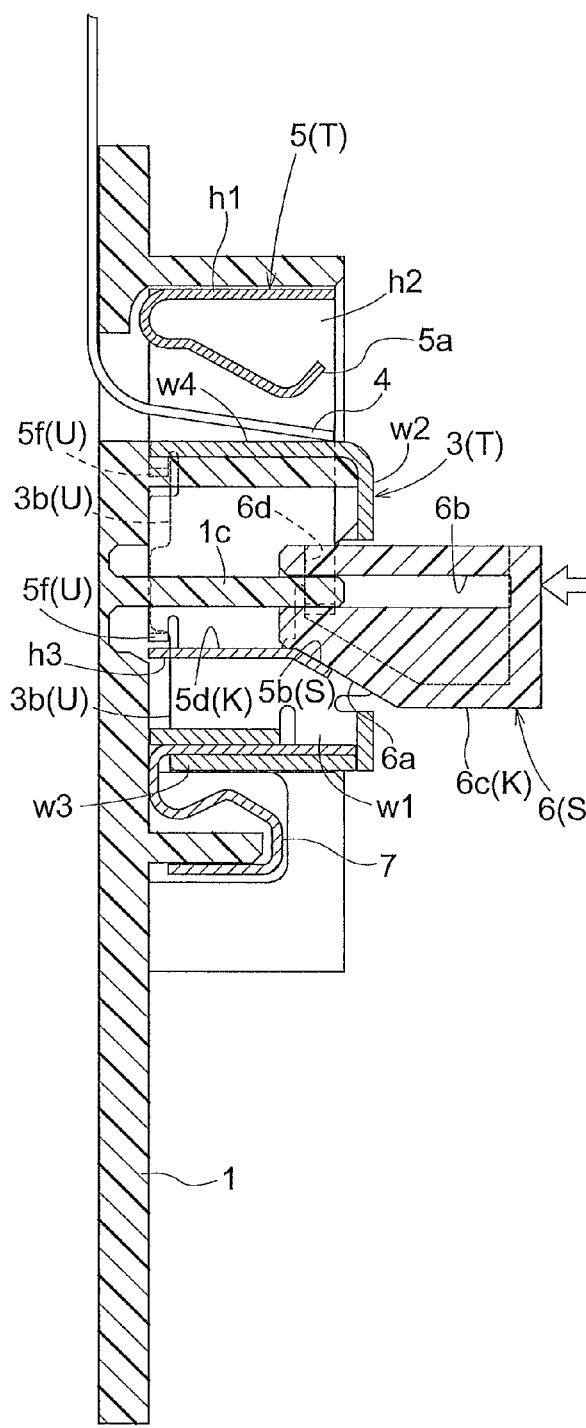
[FIG. 7A] is a section view showing the terminal box according to the second embodiment.
Figure 7B:
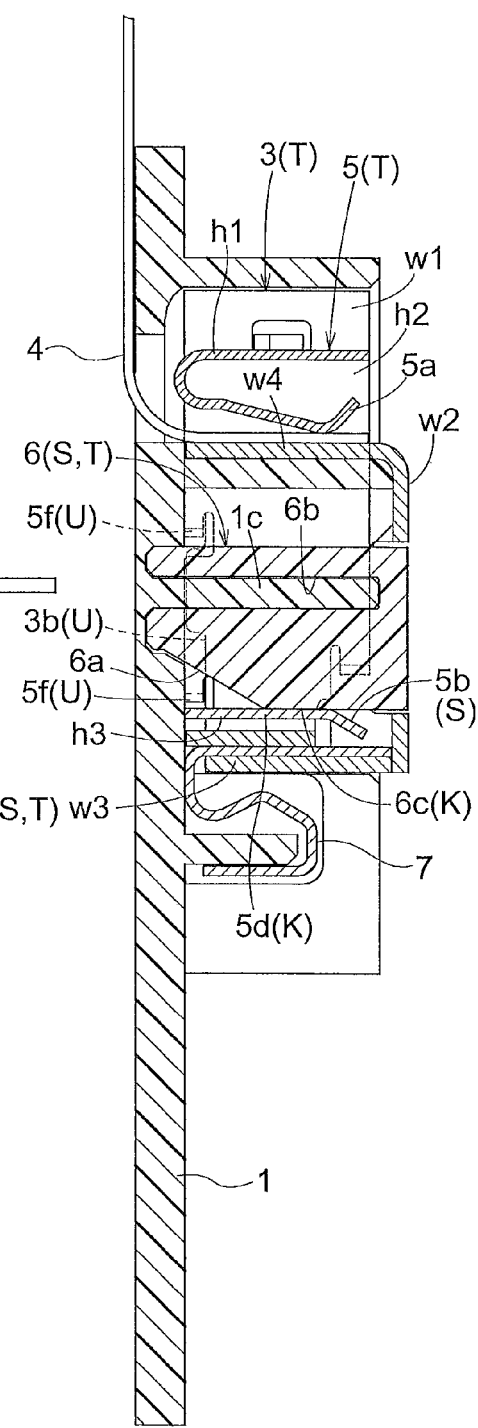
[FIG. 7B] is a section view showing the terminal box according to the second embodiment.

As shown in FIG. 6, FIG. 7A and FIG. 7B, a floating prevention mechanism U in this embodiment consists essentially of a cut raised pawl (corresponding to the "engaging convex portion") 5f formed at the lower edge portion of the long side perimeter face portion h2 of the holding portion 5 and a cutout portion (corresponding to the "guide concave portion") 3b formed at the lower edge portion of the terminal portion 3, instead of the elongate slot 5c defined in the holding portion 5 and the engaging convex portion 3a formed in the terminal portion 3 in the foregoing embodiment.

As the cut raised pawl 5f, two of them are formed by cutting and raising the lower edge portion of the long side perimeter face portion h2 in the forward and rearward portions in the sliding direction. As the cutout portion 3b, there are provided two of them at two portions in the forward and rearward sides in correspondence with the cut raised pawls 5f that come into engagement therein. Also, the cutout length of the cutout portion 3b is set with consideration to the sliding width of the cut raised pawl 5f.

The output contact portion w3 formed at the end of the terminal portion 3 is provided as a vertical wall. The clamping body 7 is configured to be capable of clamping the output cable C or the bypass diode D from the front/back side of this output contact portion w3.

[Third Embodiment]

Figure 8:
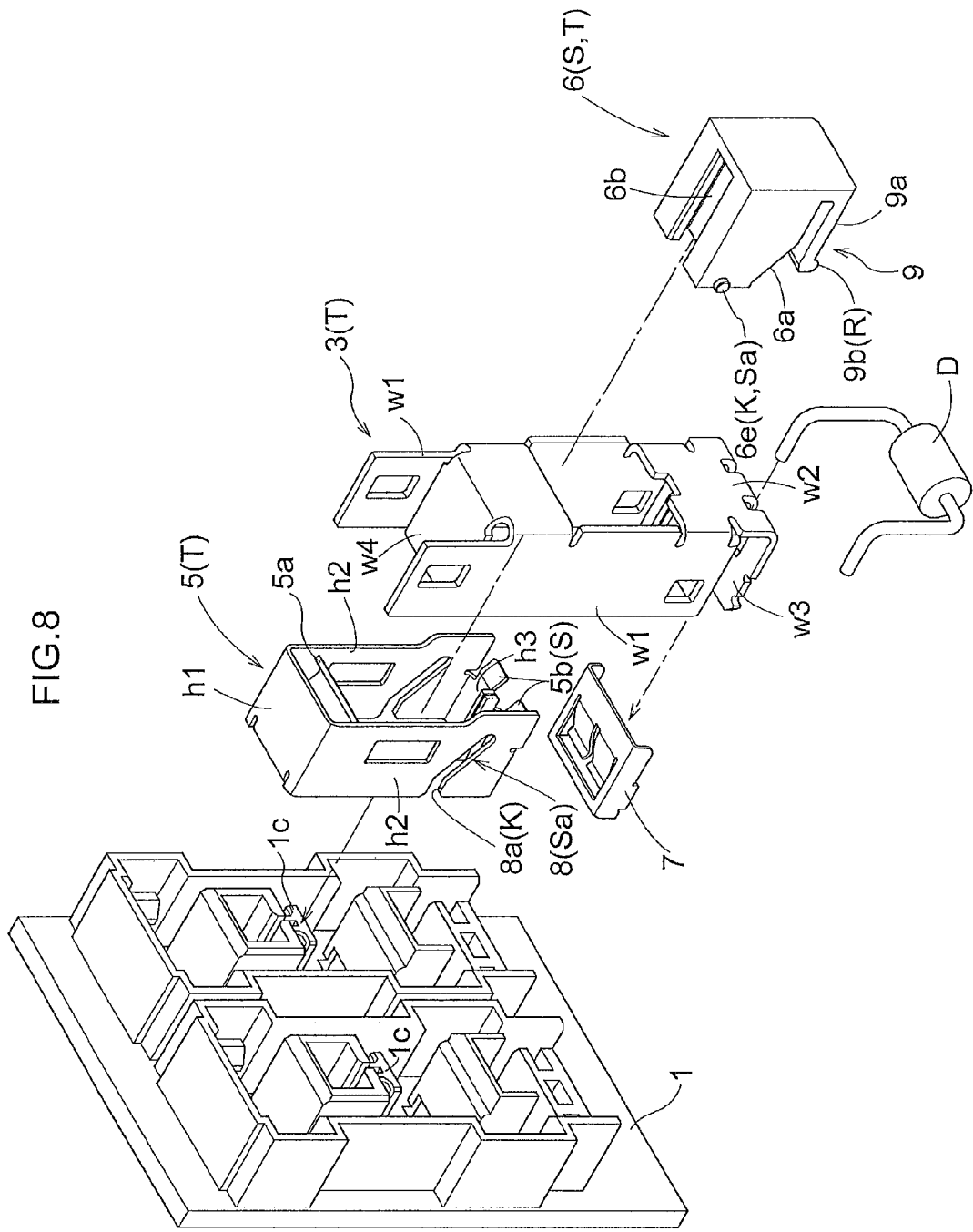
[FIG. 8] is an exploded perspective view showing a terminal box according to a third embodiment.

A terminal box B according to the third embodiment, as shown in FIG. 8, FIG. 9A and FIG. 9B, includes, separately from the slide mechanism S described in the foregoing embodiment, another slide mechanism Sa between the long side perimeter face portions (corresponding to the "lateral wall portions") h2 of the holding member 5 and the opposed lateral portions of the wedge-like member 6.

The long side perimeter face portion h2 defines an inclined groove 8 open at the lower edge thereof. The inclination angle of this inclined groove 8 is set to be same as the angle of the inclination of the pressure receiving face 5b. Further, the lower end portion of the inclined groove 8 has no inclination, but is formed along the vertical direction like the second vertical wall portion 5d, thus forming a vertical groove 8a.

At the lower ends of the opposed lateral portions of the wedge-like member 6, there are formed projections 6e that can slide along the inclined grooves 8 as being engaged within these inclined grooves 8.

If the wedge-like member 6 is pulled up when the projections 6e are engaged within the lower end portions of the inclined grooves 8, a force is transmitted from the projections 6e to the perimeter edge portions of the inclined grooves 8, whereby the holding portion 5 is slid by the component force along the lateral direction, thus being brought into the non-contacting state. The inclined grooves 8 and the projections 6e together constitute the slide mechanism Sa. Further, when the projections 6e are located in the vertical grooves 8a, no sliding of the holding portion 5 occurs, so that the contacting state is maintained. The projections 6e and the vertical grooves 8a together constitute the maintaining mechanism K.

Further, the wedge-like member 6 includes a bulging portion 9 which bulges from the upper edge portion of the main body to the opposite side to the pressing portion 5a. At the opposed corner portions of this bulging portion 9, there are formed elastic deformation pieces 9a projecting downwards. The elastic deformation piece 9a is capable of elastic deformation in the forward/reward sides relative to the base end portion of the upper end as its center of the deformation. At the lower end of the elastic deformation piece 9a, there is formed an engaging convex portion 9b that can elastically engage the engaging concave portion 1d of the box body 1. Therefore, as the wedge-like member 6 is pushed down to the lower end, this engaging convex portion 9b comes into engagement in the engaging concave portion 1d of the box body 1, thereby to prevent inadvertent disengagement of the wedge-like member 6. This engaging convex portion 9b and the engaging concave portion 1d together constitute a lock mechanism R. Incidentally, if a withdrawing force greater than a predetermined force is applied to the wedge-like member 6, engagement of the lock mechanism R will be released by elastic pivotal displacement of the elastic deformation piece 9a, so that it becomes possible to pull out the wedge-like member 6.

[Fourth Embodiment]

Figure 10:
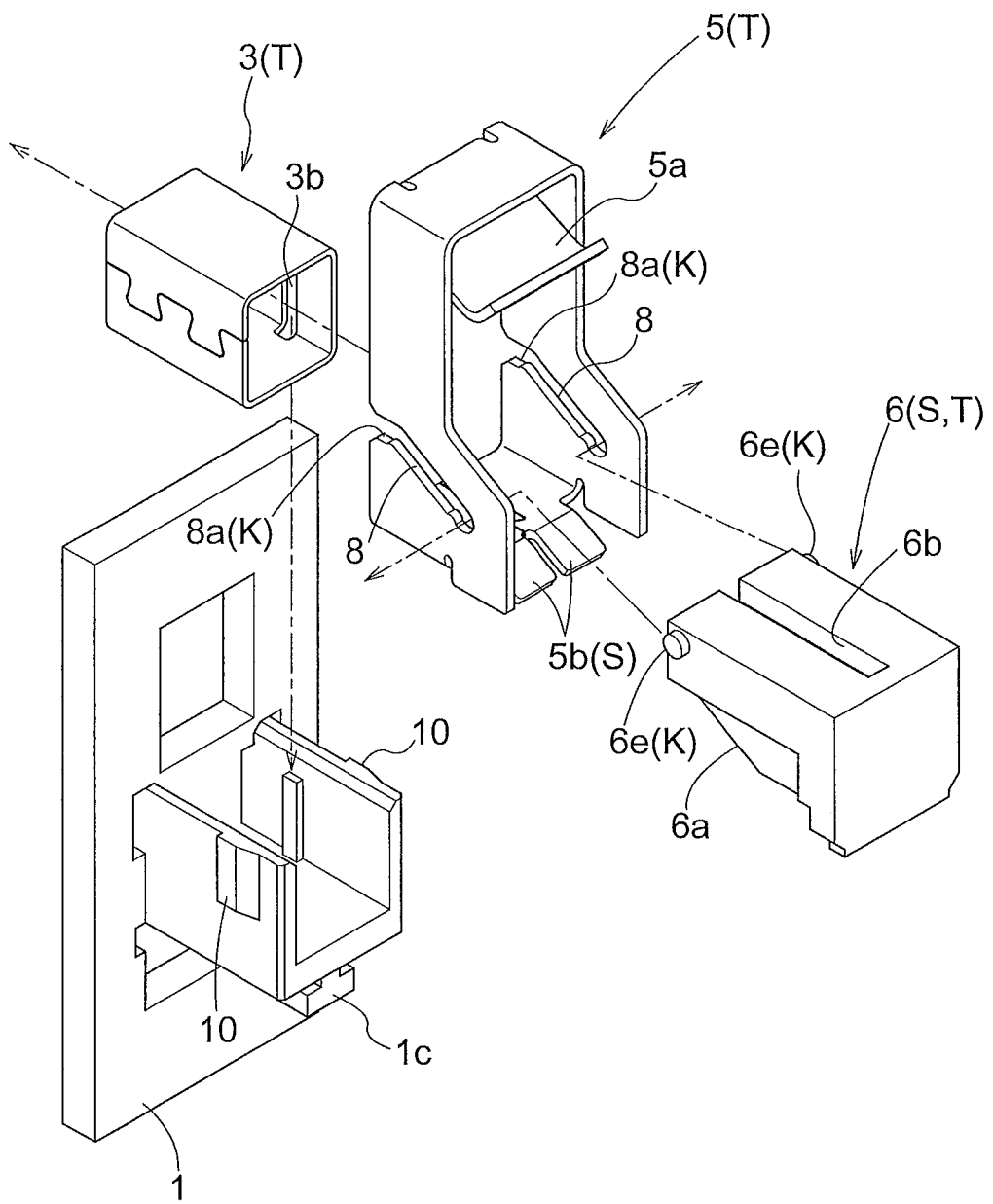
[FIG. 10] is an exploded perspective view showing a terminal box according to a fourth embodiment.

The terminal box B according to this embodiment differs from that of the third embodiment, in the configuration of the terminal portion 3 as shown in FIG. 10, FIG. 11A and FIG. 11B. The terminal portion 3, as being located in the hollow space of the holding portion 5, is fixed to the box body 1 and has a square tubular shape. The slide mechanism of the holding portion 5 in association with the pushing-in operation of the wedge-like member 6 is identical to that of the third embodiment. Further, the floating prevention mechanism U is comprised of ridge portions 10 formed on the outer faces of the erect portion of the box body 1. As this ridge portion 10 bulges upwardly of the upper edge portion of the holding portion 5, floating displacement of the holding portion 5 can be prevented effectively. Needless to say, the ridge portions 10 do not prevent the sliding movement of the holding portion 5 on the box body 1 along the lateral direction.

[Other Embodiments of Terminal Box]

Next, other embodiments will be explained.

(1) The terminal box B is not limited to the shapes, materials, and constructions described in the foregoing embodiments, but can vary. Further, the number of the terminal assembly bodies T to be provided can also vary as desired. Also, the terminal box B can be provided as a box-like structure having no lid body 2.

Figure 12A:
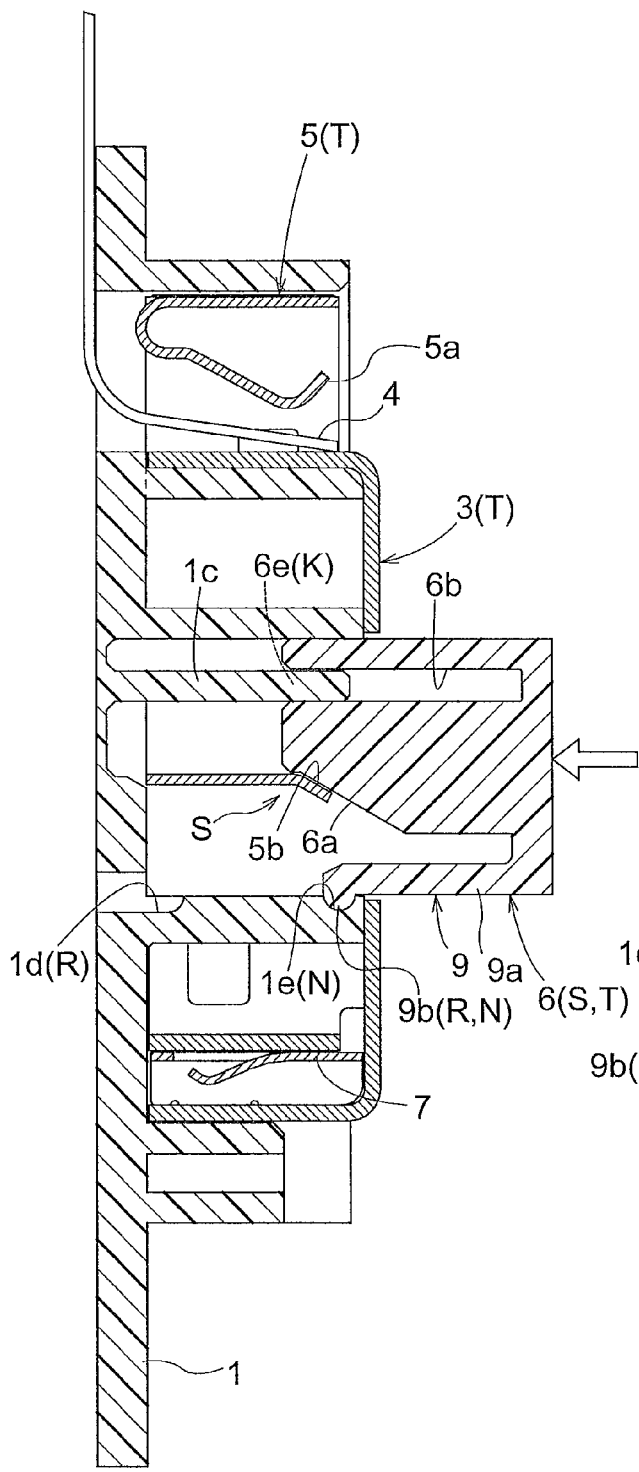
[FIG. 12A] is a section view showing a terminal box according to a further embodiment.
Figure 12B:
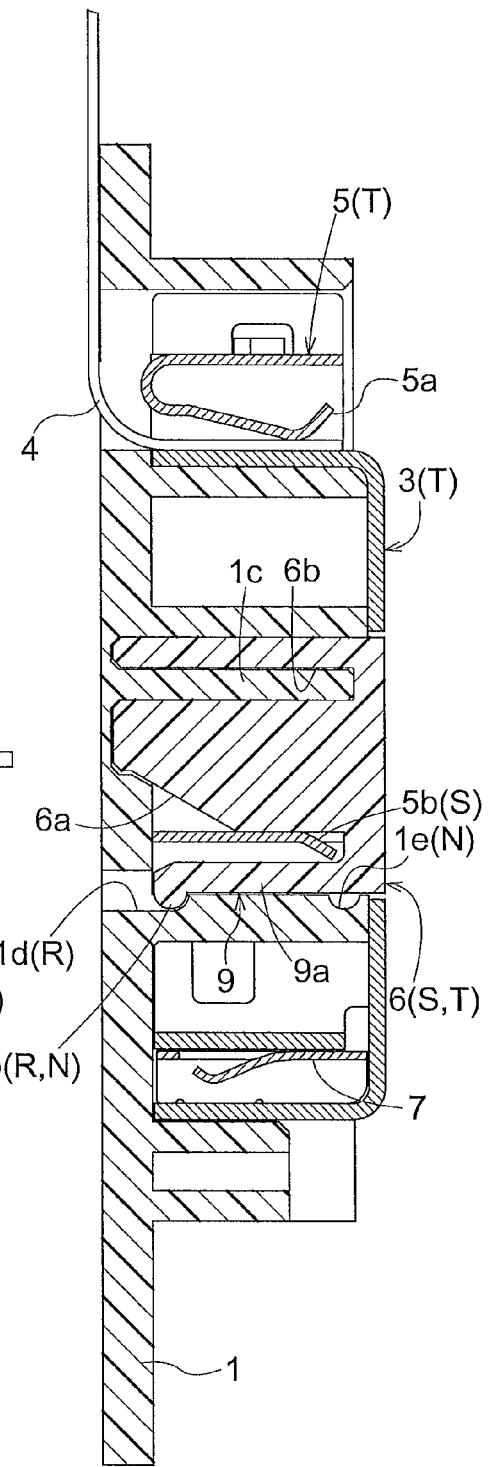
[FIG. 12B] is a section view showing a terminal box according to a further embodiment.

(2) In the foregoing embodiment, the lock mechanism R of the wedge-like member 6 was explained. But, separately from the mechanism in which the position of the wedge-like member 6 is locked at the engagement lower limit position, as illustrated in FIG. 12A and FIG. 12B, there may be also provided a disengagement prevention mechanism N which provides locking of the wedge-like member 6 at the engagement upper limit position. This disengagement prevention mechanism N consists essentially of an engaging convex portion 9b of the wedge-like member 6 and an engaging concave portion 1e in which the engaging convex portion 9b is engageable. The engaging concave portion 1e is formed at a position higher than the position of the engaging concave portion 1d of the foregoing embodiment. This disengagement prevention mechanism N may be provided singly or in combination with the lock mechanism R provided in the foregoing embodiment.

Figure 13A:
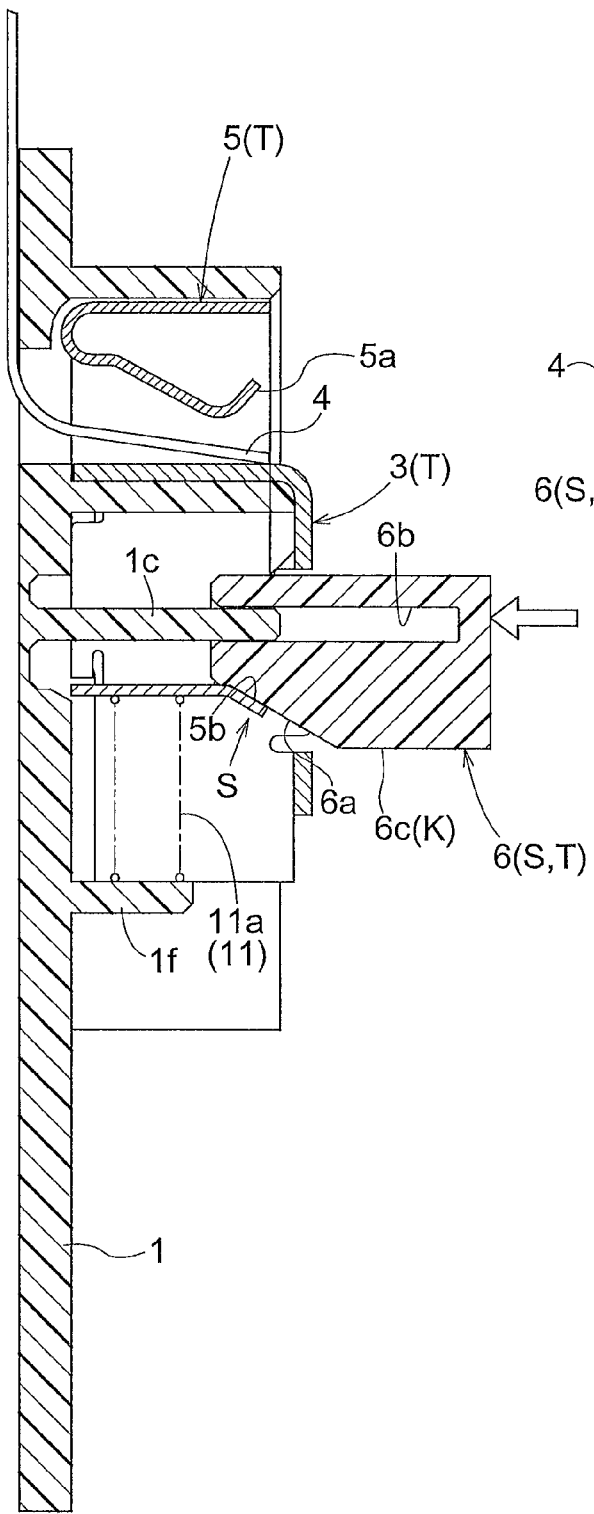
[FIG. 13A] is a section view showing the terminal box according to the further embodiment.
Figure 13B:
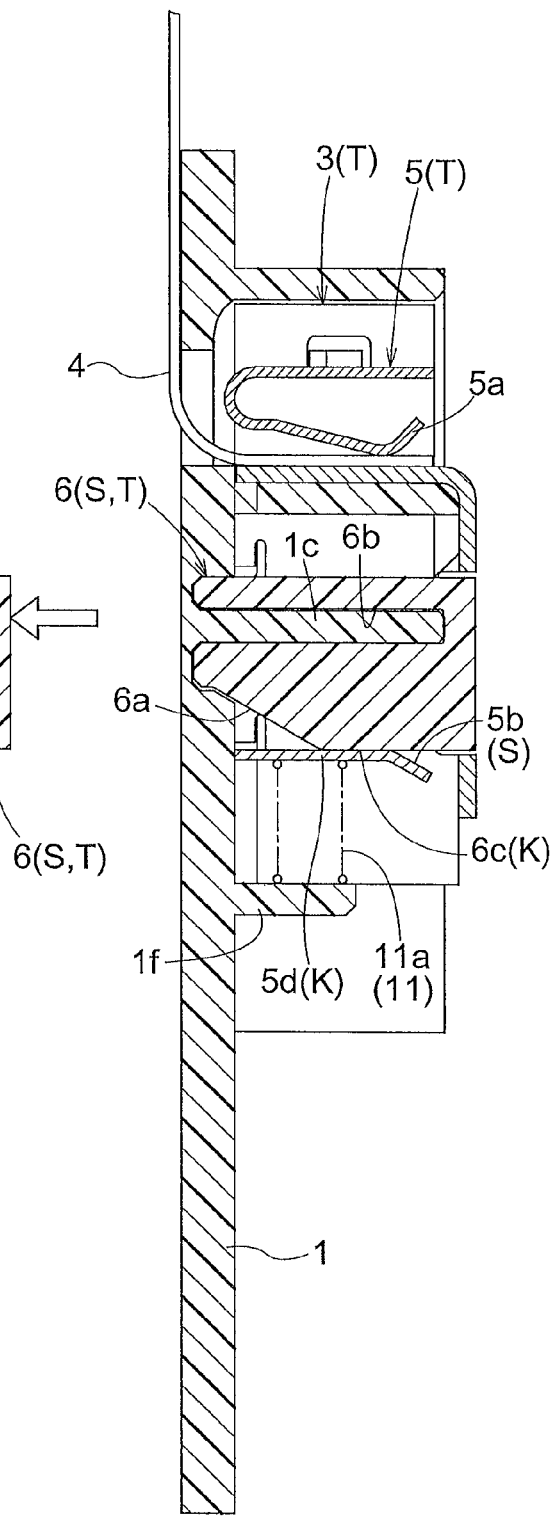
[FIG. 13B] is a section view showing the terminal box according to the further embodiment.
Figure 14:
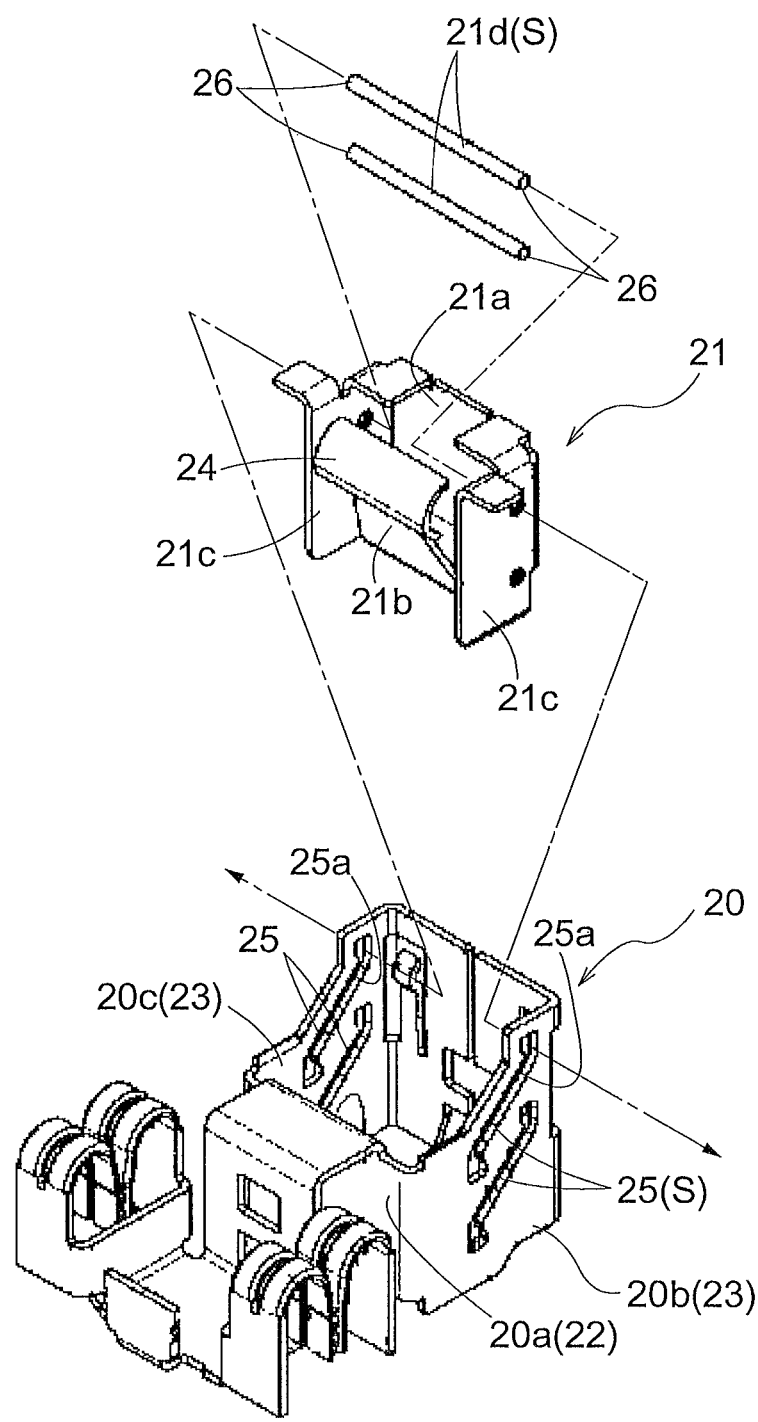
[FIG. 14] is an exploded perspective view showing a terminal box according to the prior art.
Figure 15:
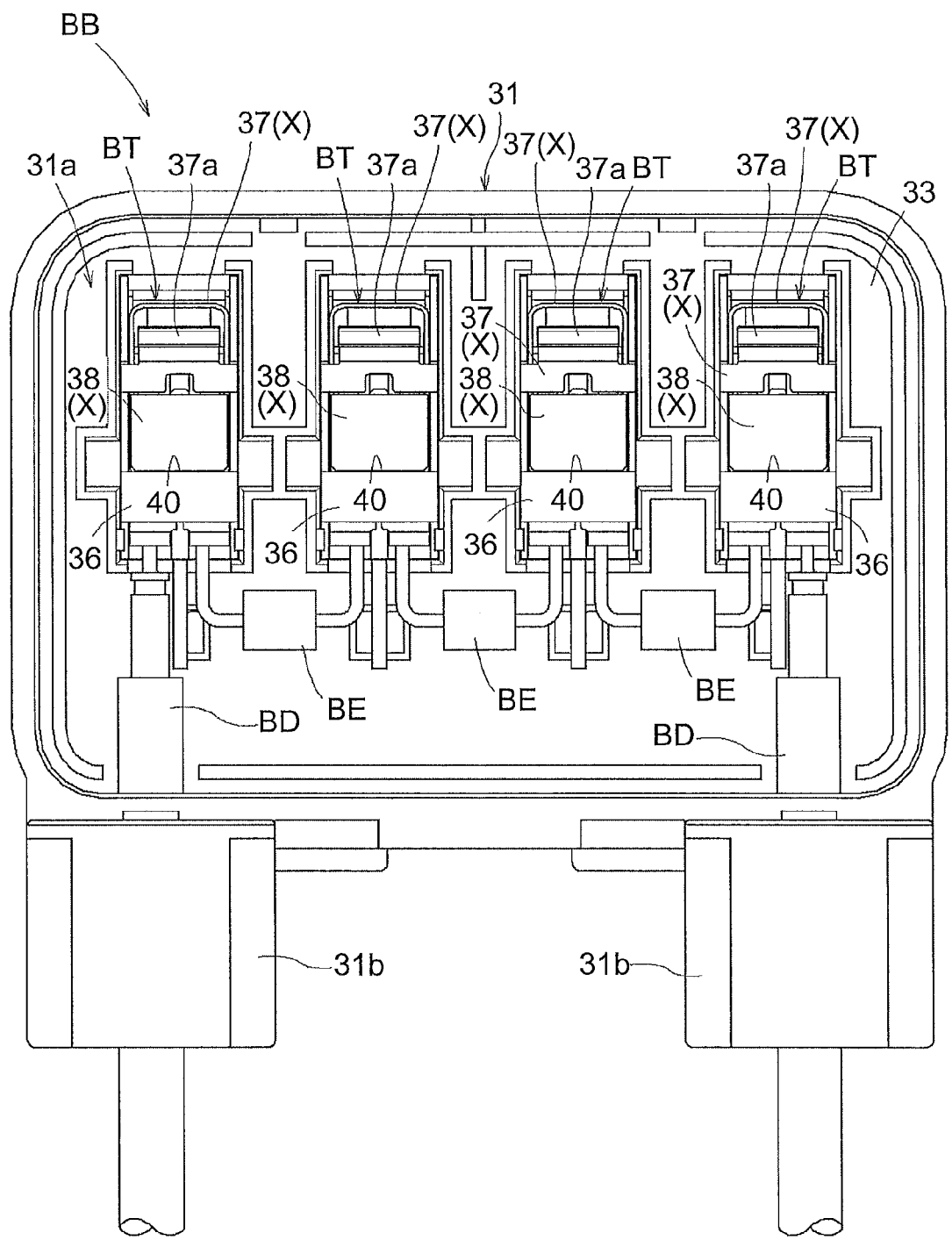
[FIG. 15] is a plane view showing the inside of the terminal box.

(3) The terminal box B may include an urging mechanism 11 for providing an urging force to the holding portion 5 to the direction of its spaced state. As one example thereof, as shown in FIG. 13A and FIG. 13B, a plate spring member 11a will be provided at one terminal end of the holding portion 5 and the box body 1 will be provided with a receiving portion 1f for receiving the plate spring member 11a. With this arrangement, when the holding portion 5 is slid into the contacting state by pushing-in of the wedge-like member 6, the wedge-like member 6 will be pushed back by the elastic resilience of the plate spring member 11a unless its pushing-in operation is effected to the extent where the maintaining mechanism K provides its function. Therefore, the spaced state will be provided, and a more reliable operation will be requested. Therefore, more reliable electric conduction/connection of the terminal 4 will be made possible.

Next, embodiments of a terminal box fixing arrangement will be described with reference to the drawings.

[Fifth Embodiment]

FIGS. 15 through 20 show a solar cell module terminal box BB which is to be fixed by the terminal box fixing arrangement of the present invention to a fixed face BA (i.e. "a face to be fixed") constituted of e.g. a back face of a solar cell module (not shown), with a resin-based adhesive agent BC such as an epoxy resin-based or silicone resin-based adhesive agent.

The terminal box BB includes a box-like box body 31 formed of resin and a lid body 32 formed of resin. The box body 31 includes an upper opening portion 31a, which is closed by the lid body 32. Further, in the box body 31, there is integrally formed a cable support portion 31b. The box body 31 integrally includes a bottom plate 33 having an outer bottom face 33a which is bonded and fixed to the fixed face BA with the adhesive gent BC. This bottom plate 33 defines a plurality of opening portions 34 for connection of external terminals.

The box body 31 accommodates terminal portions 36 of terminal plate. To each terminal portion 36, an external terminal 35 of a solar cell module extended toward the back face (fixed face) is connected. Further, the box body 31 integrally forms the cable support portions 31b. Via this cable support portion 31b, an output cable BD connected to a rechargeable battery or the like is introduced into the box body 31 to be electrically connected to the terminal portion 36.

The box body 31 includes a movable operational portion X switchable between a contacting state for electrically connecting the external terminal 35 introduced through each opening portion 34 to the terminal portion 36 and a non-connecting state. The movable operational portion X is comprised of a holding portion 37 and a wedge-like member 38. The holding portion 37 includes a pressing portion 37a for pressing the external terminal 35 against the terminal portion 36 for establishing electric connection therebetween. The wedge-like member 38 renders the holding portion 37 slidable along the plate face of the bottom plate 33.

The box body 31 accommodates therein a plurality of terminal assembly bodies BT mounted in juxtaposition, each body BT comprising an assembly of the terminal portion 36, the holding portion 37 and the wedge-like member 38. Each terminal assembly body BT is accommodated in correspondence with each opening portion 34.

Each terminal assembly body BT is mounted to the box body 31 by fixing the terminal portion 36 to the box body 31. Adjacent terminal assembly bodies BT are electrically connected to each other via a bypass diode BE. To the terminal assembly bodies BT disposed at the opposed ends, the output cables BD are electrically connected.

Figure 16:
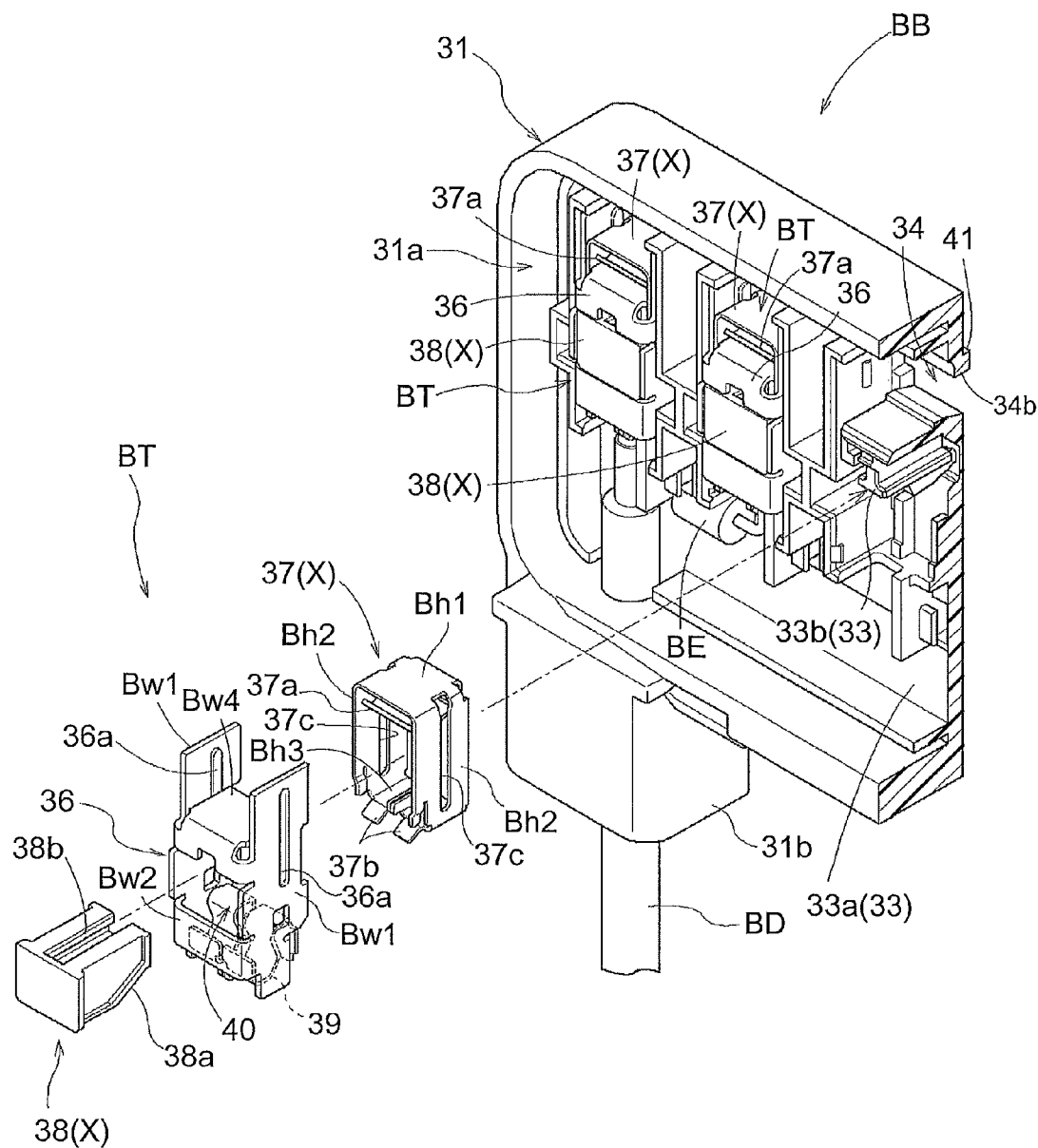
[FIG. 16] is an exploded perspective view showing the inside of the terminal box.
Figure 17:
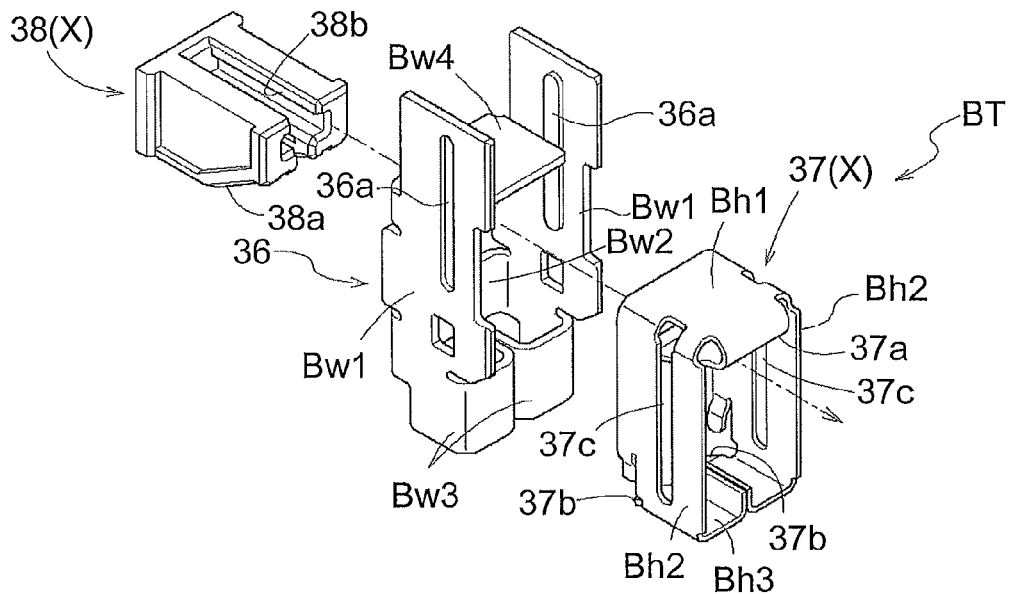
[FIG. 17] is an exploded perspective view of a terminal assembly body.

The respective terminal assembly bodies BT have an identical construction. Therefore, one of them will be explained next. The holding portion 37 is formed of a metal plate and as shown in FIG. 16 and FIG. 17, includes two mutually opposed long side perimeter wall portions Bh2 and two short side perimeter wall portions Bh1, Bh3 opposed to each other at the opposed longitudinal ends of the long side perimeter wall portions Bh2. These together form a rectangular tubular shape having rectangular openings at the tubular ends. The holding portion 37 is assembled with the terminal portion 36 to be slidable along the longitudinal direction of the long side perimeter wall portions Bh2, with the wall faces of the respective perimeter wall portions Bh1-Bh3 being aligned along the depth direction of the box body 31.

The first short side perimeter wall portion Bh1 includes, as an extension thereof, a pressing portion 37a folded toward the tubular inner side. The pressing portion 37a is extended to be elastically pivotable about the folded portion as the pivotal point, along the longitudinal direction of the long side perimeter wall portion Bh2 (the sliding movement direction of the holding portion 37). The second short side perimeter wall portion Bh3 includes, as extensions thereof, a pair of inclined plate portions 37b inclined toward the tubular outer side. These inclined plate portions 37b receive the inclined wedge face 38a of the wedge-like member 38 through face contact therewith.

Each one of the long side perimeter wall portions Bh2 defines a slot 37c elongate along the longitudinal direction of the long side perimeter wall portion Bh2. This elongate slot 37c comes into engagement with an engaging convex portion 36a provided in the terminal portion 36. And, the holding portion 37 is assembled to be slidable along the longitudinal direction of the elongate slot 37c relative to the terminal portion 36.

Figure 18:
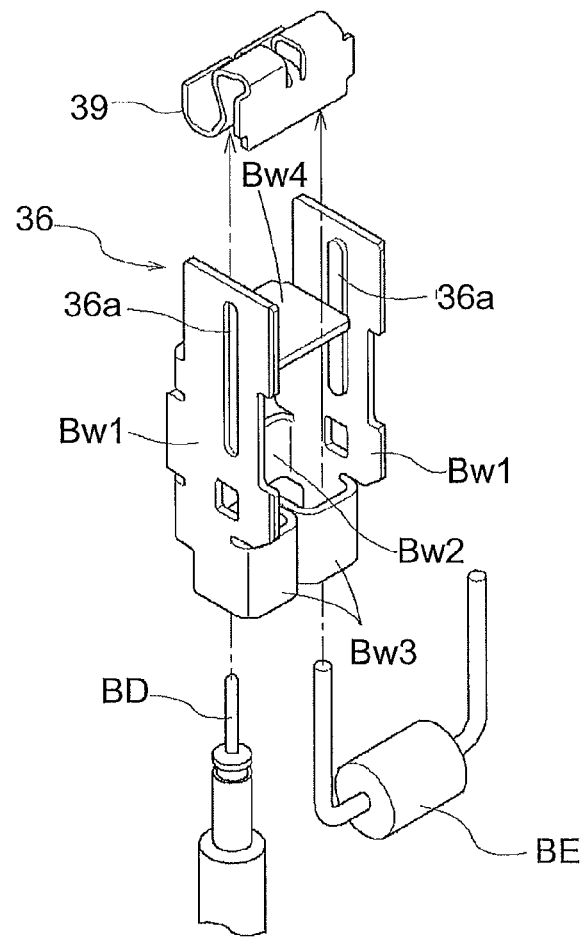
[FIG. 18] is an exploded perspective view of a terminal assembly body.

The terminal portion 36 is formed of a metal plate and as shown in FIGS. 16 through 18, includes a pair of support wall portions Bw1 and a connecting wall portion Bw2. To the pair of support wall portions Bw1, the pair of long side perimeter wall portions Bh2 of the holding portion 37 can come into slidable contact respectively. The connecting wall portion Bw2 interconnects one end portions of the two support wall portions Bw1.

The support wall portion Bw1 defines the engaging convex portion 36a engageable within the elongate slot 37c of the holding portion 37 from the outer side of the holding portion. At the first lateral side of the support wall portion Bw1, there is provided an output contact portion Bw3 having a U-shaped cross section for connection thereto of an output cable BD or a bypass diode BE. To this output contact portion Bw3, there is attached a clamping body 39 for clamping the output cable BD or the bypass diode BE between the clamping body 39 and the output contact portion Bw3. With this clamping body 7, the output cable C or the bypass diode D can be clamped to the output contact portion Bw3, for establishing electric conduction and connection.

The connecting wall portion Bw2 includes a connecting plate portion Bw4 to be inserted between the pair of support wall portions Bw1 and an opening 40 which the wedge-like member 38 is to enter. The holding portion 37 is assembled to the terminal portion 36 such that the connecting plate portion Bw4 is inserted between the pair of long side perimeter wall portions Bh2. In the course of this operation, the external terminal 35 will be pressed by the pressing portion 37a to come into contact with the connecting plate portion Bw4, thus establishing electric connection between the external terminal 35 and the terminal portion 36.

The wedge-like member 38 is formed of a synthetic resin and as shown in FIG. 16 and FIG. 17, includes inclined wedge faces 36a and a rail groove 38b. To the inclined wedge faces 38a, inclined plate portions 37b of the holding portion 37 come into slidable contact. Into the rail groove 38b, a rail portion 33b formed integral with the bottom plate 33 will be engaged.

The wedge-like member 38 is assembled in such a manner as to be slidable in the depth direction of the box body 31 along the rail portion 33b.

Figure 19A:
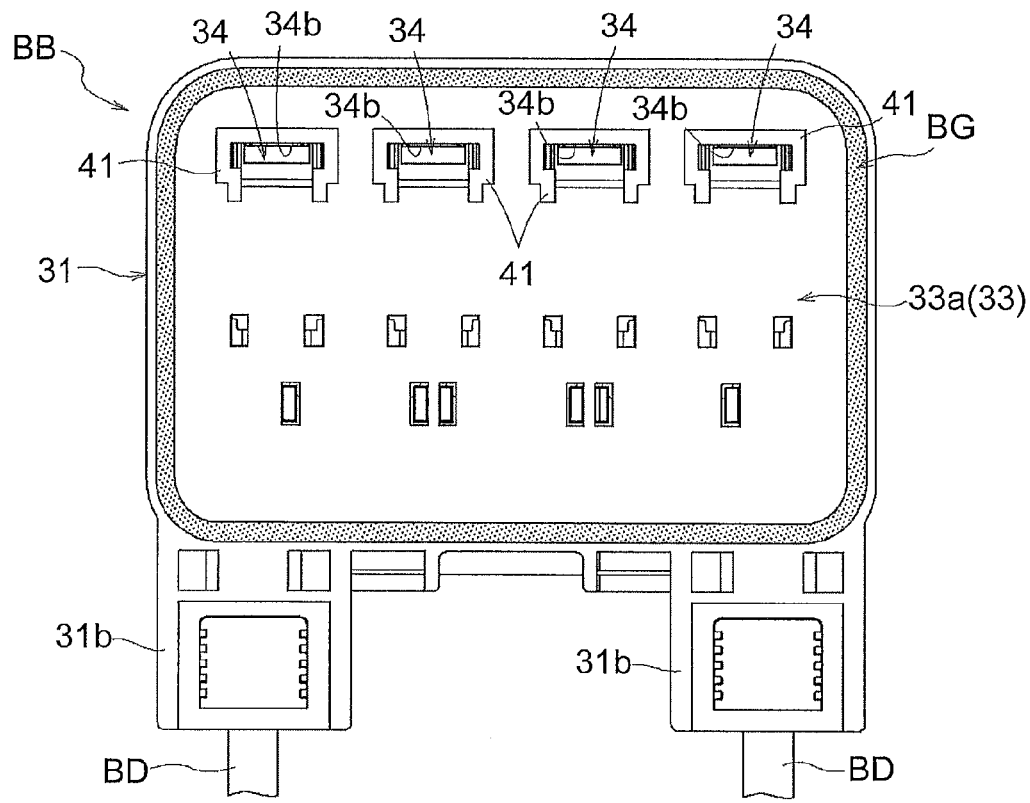
[FIG. 19A] is a plane view showing an outer bottom face of a bottom plate of a box body.
Figure 19B:
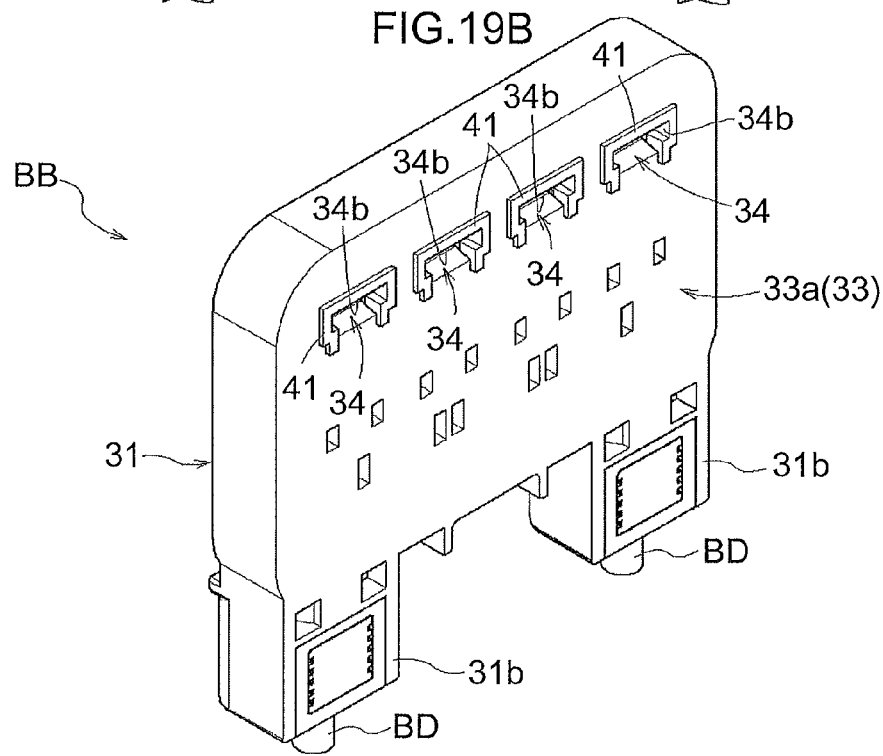
[FIG. 19B] is a perspective view showing the bottom plate of the box body as seen from the side of the outer bottom face.

As shown in FIG. 19, in an outer bottom face 33a of the bottom plate 33, there is set an application area BG where an amount of adhesive agent is to be applied. This application area BG is set as a continuous approximately rectangular ring-like shape along the outer perimeter edge of the outer bottom face 33a.

At the position between the application area BG and the perimeter edge 34b of the opening 34 as seen in the plane view of the outer bottom face 33a, there is integrally formed a stepped portion 41 corresponding to each opening 34. Each stepped portion 41 is formed in the outer bottom face 33a in the approximately angular U-shape with a convex face portion thereof projecting from this outer bottom face 33a extending along the perimeter edge 34b of the rectangular opening portion 34.

Next, a procedure of connecting the external terminal 35 to the terminal portion 36 will be explained. As shown in FIG. 20A, under a condition where the gap between the pressing portion 37a and the connecting plate portion Bw4 is kept large (i.e. the condition of the wedge-like member 38 being not yet pressed in), an amount of unhardened adhesive agent BC will be applied in advance to the application area BG.

Next, as shown in FIG. 20B, the outer bottom face 33a is affixed to the fixed face BA in such a manner that the outer terminal 35 is inserted through the opening 34 to the gap between the pressing portion 37a and the connecting plate portion Bw4. In the course of this, flowing of an excessive amount of adhesive agent BC will be blocked and stopped by the convex face portion (stepped portion) 41, so that intrusion of the adhesive agent BC toward the opening 34 can be prevented.

Next, as shown in FIG. 20C, the wedge-like member 38 will be pushed in such that the rail portion 33b may be engaged into the rail groove 38b. With this, the holding portion 37 will be slid so that the pressing portion 37a presses the external terminal 35 toward the connecting plate portion Bw4 through the face contact between the inclined edge faces 38a and the inclined plate portion 37b and the external terminal 35 is clamped between the pressing portion 37a and the connecting plate portion Bw4, whereby electric connection is established between the external terminal 35 and the terminal portion 36 (connecting plate portion Bw4) through the opening portion 34.

Therefore, with a sliding movement of the holding portion 37 in association with a pushing or pulling operation of the wedge-like member 38, switchover is made possible between the connecting state where electric connection is established between the terminal portion 36 and the external terminal 35 and the non-connecting state where the external terminal 35 is kept away from the terminal portion 36.

[Sixth Embodiment]

Figure 21A:
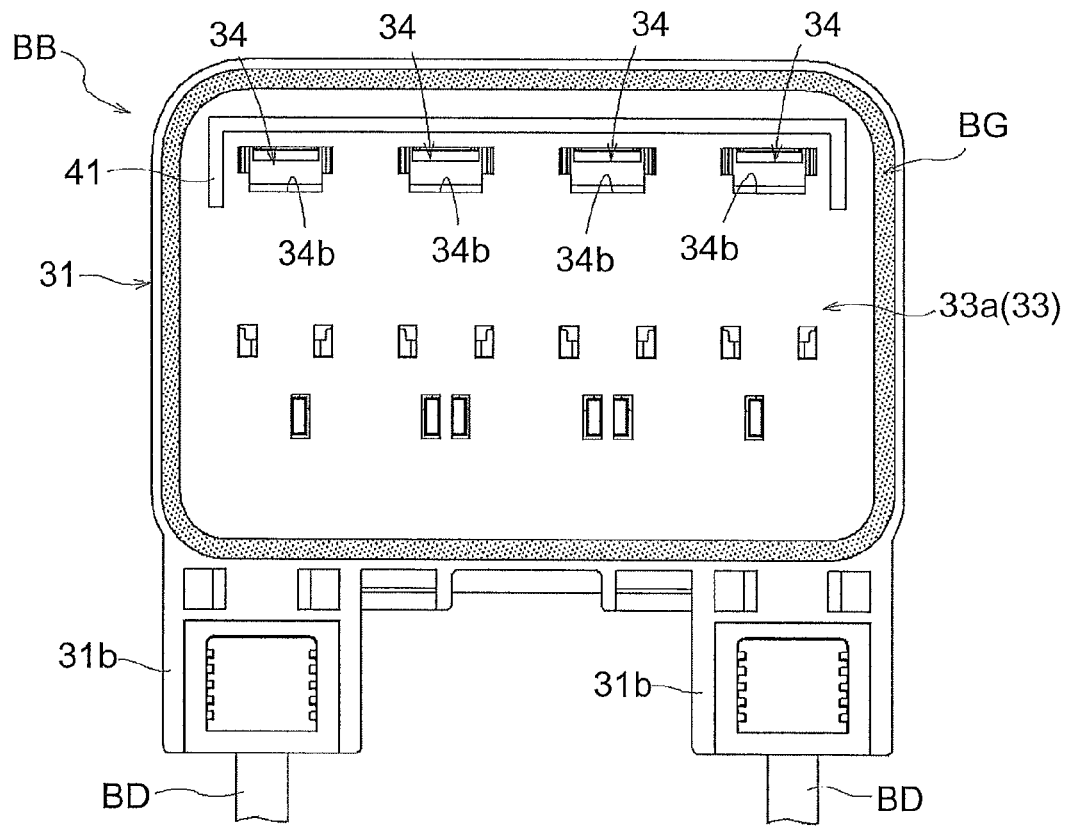
[FIG. 21A] is a plane view showing a terminal box fixing arrangement according to a sixth embodiment and showing an outer bottom face of a bottom plate of a box body.
Figure 21B:
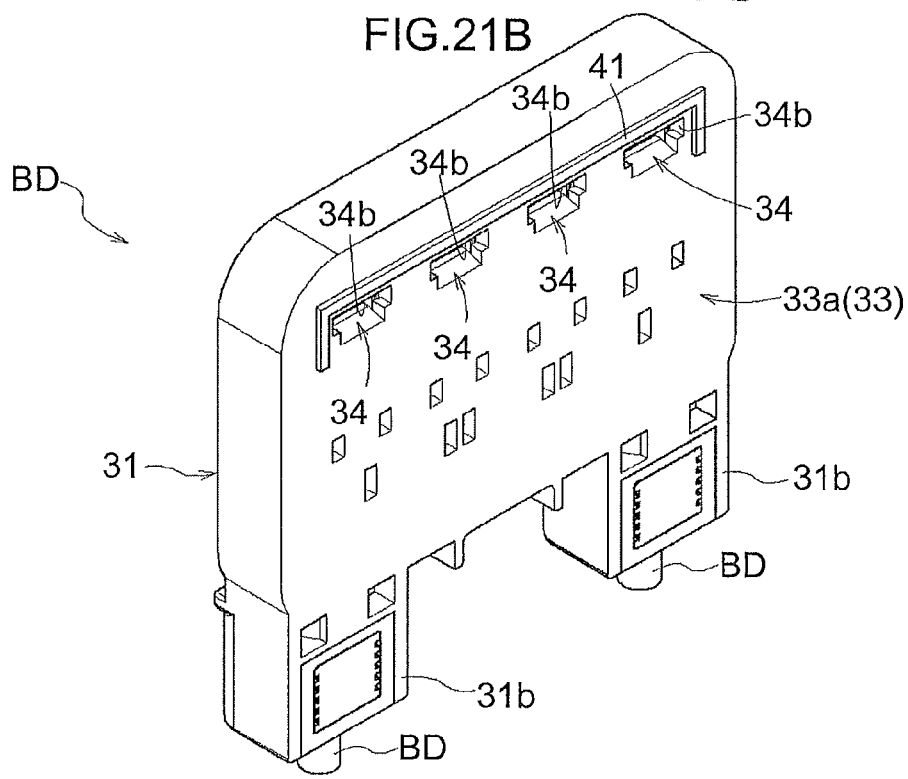
[FIG. 21B] is a perspective view showing a terminal box fixing arrangement according to a sixth embodiment and showing the bottom plate of the box body as seen from the side of the outer bottom face.

FIG. 21 shows a sixth embodiment. In this embodiment, in the plane view of the outer bottom face 33a, a continuous convex face portion is provided along the spaces between the application area BG and the perimeter edges 34b of the plurality of opening portions 34. With this convex face portion, there is integrally formed a stepped portion 41 surrounding the plurality of openings 34 altogether. The rest of the arrangement is identical to that of the fifth embodiment.

[Seventh Embodiment]

FIG. 22 shows a seventh embodiment. In this embodiment, instead of the stepped portion 41 formed of the convex face portion shown in the sixth embodiment above, a stepped portion 41 is formed of a concave face portion provided in the outer bottom face 33a which is formed concave relative to the outer bottom face 33a. The rest of the arrangement is identical to that of the sixth embodiment.

Figure 22A:
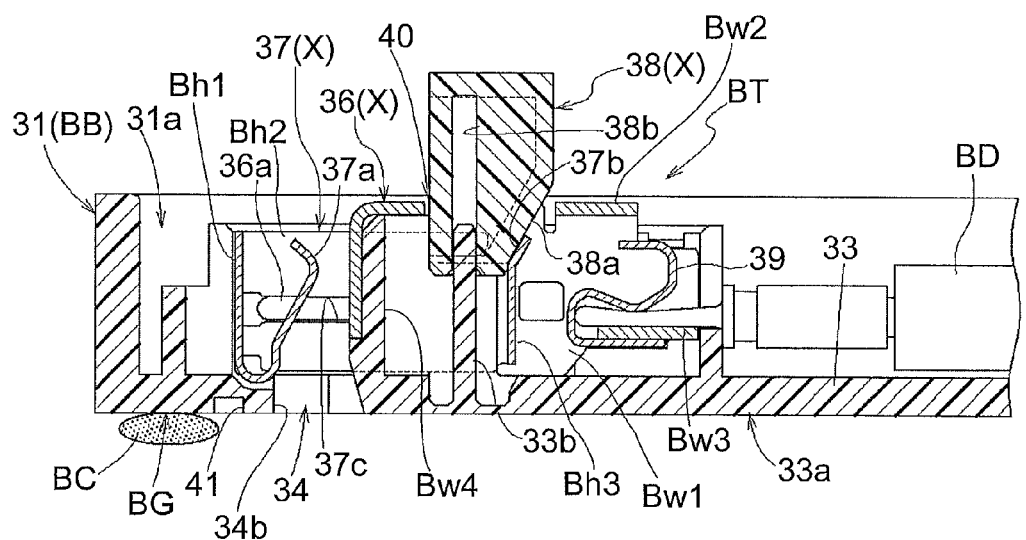
[FIG. 22A] is a section view showing a terminal box fixing arrangement according to a seventh embodiment and showing a terminal box prior to fixing.
Figure 22B:
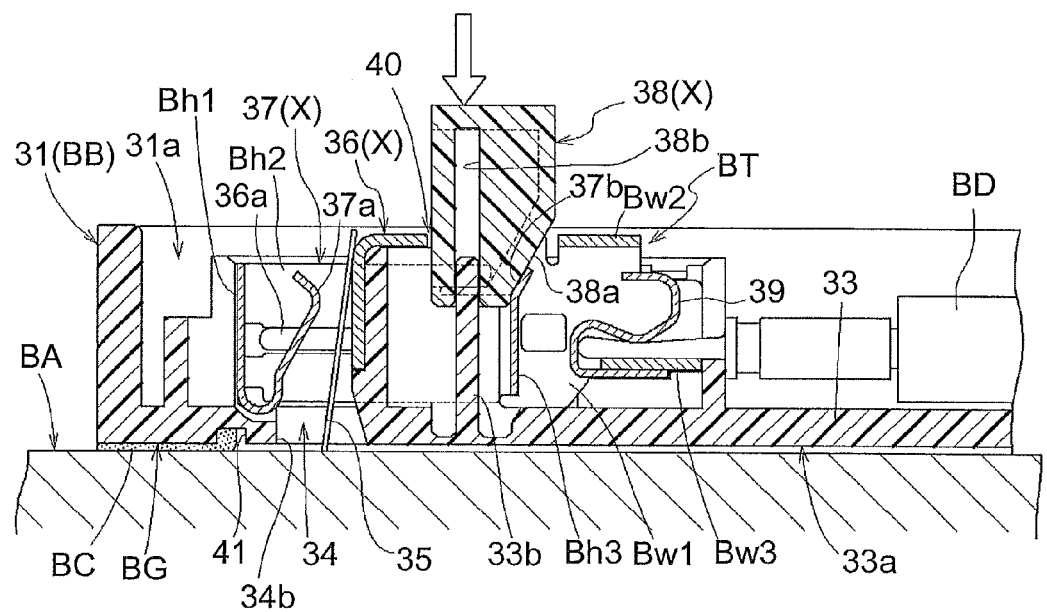
[FIG. 22B] is a section view showing a terminal box fixing arrangement according to a seventh embodiment and showing a terminal box after fixation.

According to this embodiment, when an amount of unhardened adhesive agent BC is applied to the application area BG as shown in FIG. 22A, and then the outer bottom face 33a is affixed to the fixed face BA as shown in FIG. 22B, excess adhesive agent BC will be accumulated within the concave face portion (stepped portion) 41. Therefore, intrusion of the adhesive agent BC toward the opening 34 can be effectively prevented.

[Eighth Embodiment]

Figure 23:
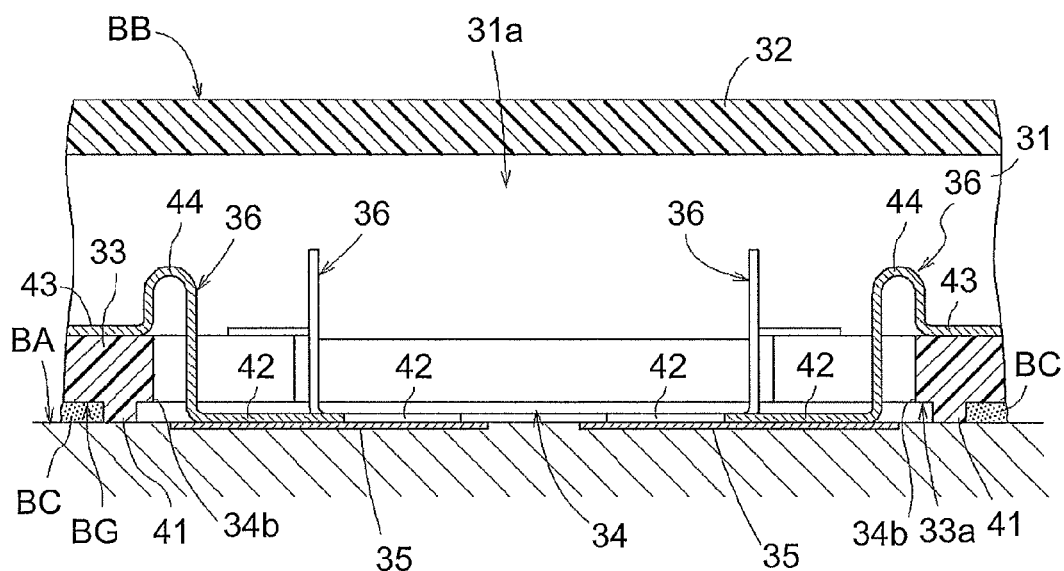
[FIG. 23] is a section view showing a terminal box fixing arrangement according to an eighth embodiment.
Figure 24:
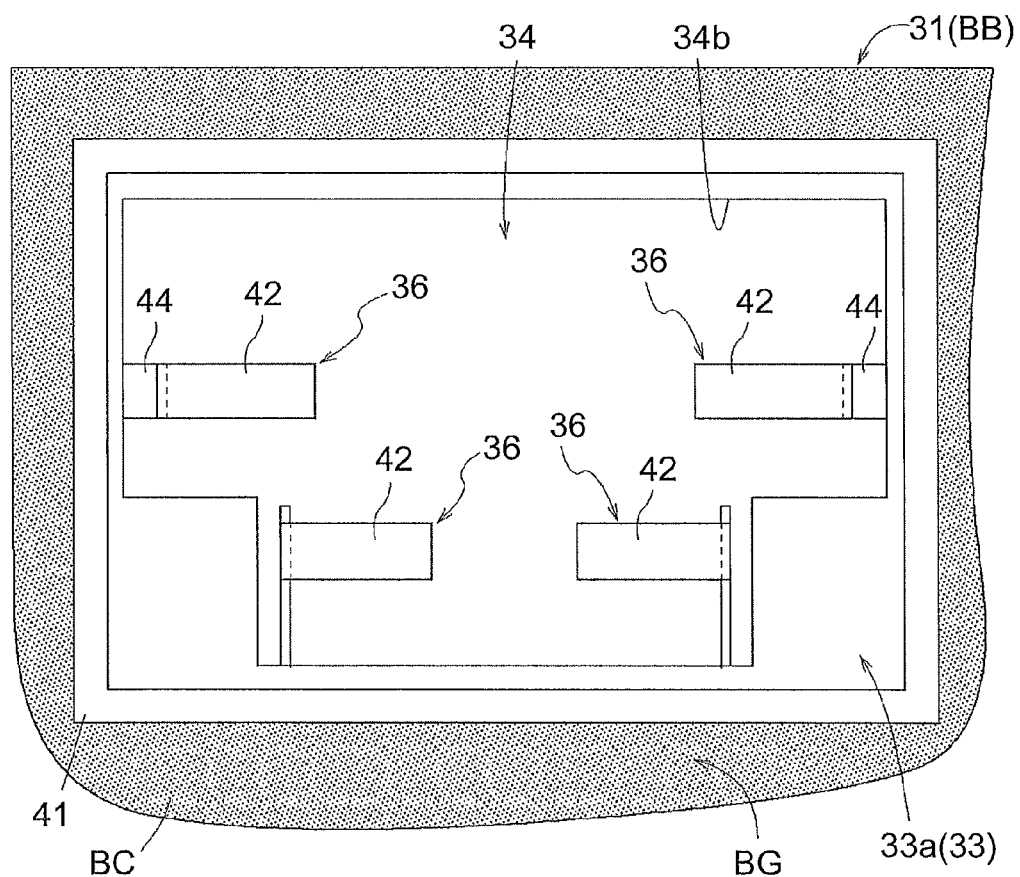
[FIG. 24] is a plane view showing an outer bottom face of a bottom plate of a box body in the terminal box fixing arrangement according to the eighth embodiment.

FIG. 23 and FIG. 24 show an eighth embodiment of the present invention. In this embodiment, for allowing electric connection of the terminal box BB to the external terminal 35, a terminal portion 36 made of metal and accommodated in the box body 31 is brought into pressed contact with the external terminal 35 placed in opposition to the opening portion 34 under a posture along the fixed face BA and then soldered or welded thereto.

More particularly, a connecting portion 42 of each one of the plurality of terminal portions 36 for connection to the external terminal 35 is connected to a terminal portion body 43 via an elastic bent portion 44 and projects through a common opening portion 34 to the outside of the outer bottom face 33a.

And, as shown in FIG. 23, the outer bottom face 33a will be pressed against the fixed face BA with elastic deformation of the elastic bent portion 44. With this, due to the elastic resilience of the elastic bent portion 44, the connecting portion 42 is pressed against the external terminal 35. Thereafter, by effecting soldering or welding, the electrically connected state to this external terminal 35 can be maintained.

In the outer bottom face 33a of the bottom plate 33, there is set the application area BG for application of adhesive agent. And, a stepped portion 41 is integrally formed in the outer bottom face 33a at the portion between the application area BG and the perimeter edge of the opening portion 34 as seen in the plane view of the outer bottom face 33a. In this embodiment, the stepped portion 41 is formed along the boundary portion of the application area BG. The stepped portion 41 is formed as a continuous rectangular ring-shaped with a convex face portion projecting from the outer bottom face 33a surrounding the perimeter edge 34b of the opening portion 34.

[Ninth Embodiment]

Though not shown, in the fifth and eighth embodiments too, instead of the stepped portion 41 formed of a convex face portion, like the seventh embodiment, the stepped portion 41 may be comprised of a concave face portion facing the outer bottom face 33a and formed concave relative to this outer bottom face 33a.

[Other Embodiments of Terminal Box Fixing Arrangement]

(1) In the terminal box fixing arrangement according to the present invention, the stepped portion 41 may be formed at the portion between the application area BG and the perimeter edge 34b of the opening portion 34 as seen in the plane view of the fixed face BA.

(2) In the terminal box fixing arrangement according to the present invention, the stepped portion 41 may be formed at the portion between the application area BG and the perimeter edge 34b of the opening portion 34 as seen in the plane view of the fixed face BA, in both the fixed face BA and the outer bottom face 33a.

(3) In the terminal box fixing arrangement according to the present invention, the stepped portion 41 comprised of a convex face portion or a concave face portion may be formed intermittently along the portion between the application area BG and the perimeter edge 34b of the opening portion 34.

Incidentally, in the foregoing description, reference marks/numerals were provided for facilitating reference to the drawings. It is understood, however, that the provision of these reference marks/numerals is not to limit the scope of the invention to the arrangements shown in the accompanying drawings. Further, it is needless to say that the present invention may be embodied in any other way as long as such modifications do not deviate from the essential features of the present invention.

The invention claimed is:

1. A terminal box comprising:
   a box body having a bottom portion and at least one sidewall, the bottom portion and the at least one sidewall defining an interior of the box body;
   a terminal portion fixed to the box body and disposed within the interior of the box body;
   a pressing portion disposed within the interior of the box body;
   a holding portion disposed within the interior of the box body; and
   a slide mechanism disposed within the interior of the box body;
   wherein the bottom portion of the box body has an opening portion capable of receiving a terminal inserted therein from the outside;
   the terminal portion is capable of establishing electric conduction between the terminal portion and the terminal upon contact therewith;
   the pressing portion is switchable between a contacting state in which the pressing portion clamps the terminal with the terminal portion for establishing electric conduction between the terminal portion and the terminal and a spaced state spaced apart from the terminal portion;
   the holding portion is integral with the pressing portion and the holding portion and pressing portion are slidable within the interior of the box body along a direction of movement of the pressing portion towards and away from the terminal portion;
   the slide mechanism is capable of forming the contacting state by causing the holding portion to slide and the slide mechanism includes a wedge-like member having an inclined wedge face defined on the wedge-like member and a pressure receiving face formed in the holding portion;
   the wedge-like member guides the holding portion to the contacting state by causing the inclined wedge face to slidably enter the holding portion while bearing against a portion of the box body; and
   the pressure receiving face receives the inclined wedge face through face-contact therewith.

2. The terminal box according to claim 1, further comprising a maintaining mechanism disposed within the interior of the box body for maintaining the contacting state of the pressing portion.

3. The terminal box according to claim 2, wherein the maintaining mechanism includes a first vertical wall portion formed at a terminal end of the inclined wedge face of the wedge-like member and a second vertical wall portion that is formed at a terminal end face of the pressure receiving face of the holding portion and comes into face-contact with the first vertical wall portion.

4. The terminal box according to claim 2, wherein the maintaining mechanism comprises a lock mechanism for preventing inadvertent disengagement of the wedge-like member.

5. The terminal box according to claim 2, wherein the maintaining mechanism comprises a cover member attached to the box body for preventing inadvertent disengagement of the wedge-like member from the holding portion.

6. The terminal box according to claim 1, wherein the portion of the box body beared against by the wedge-like member includes a rail member mounted erect on the box body; and
   the wedge-like member is engaged with the rail member to be movable along a longitudinal direction of the rail member.

7. The terminal box according to claim 1, further comprising a floating prevention mechanism disposed within the interior of the box body for preventing floating of the holding portion from the box body.

8. The terminal box according to claim 7, further comprising a support wall portion formed integrally with the terminal portion and supporting the slide movement of the holding portion through sliding contact therewith; and
   wherein the floating prevention mechanism includes a guide concave portion formed in a first sliding contact face between the support wall portion and the holding portion to be formed elongate in the sliding direction and an engaging convex portion formed in a second sliding contact face and engageable with the guide concave portion, the engaging convex portion having a projecting perimeter wall portion formed by a sheared face formed by embossing.

9. The terminal box according to claim 1, further comprising an urging mechanism disposed within the interior of the box body for providing an urging force to the holding portion toward the spaced state.

10. The terminal box according to claim 1, wherein the holding portion includes a pair of lateral wall portions that extend along opposed lateral portions of the wedge-like member, each lateral wall portion including a pair of inclined grooves, a pair of projections being provided in the opposed lateral portions of the wedge-like member that engage within the inclined grooves.

11. A terminal box fixing arrangement wherein:
a terminal box includes a bottom plate, at least one sidewall, an opening portion and a terminal portion, the bottom plate and the at least one sidewall define an interior of the terminal box, and the terminal portion is disposed within the interior of the terminal box;
the bottom plate includes a bottom face configured to be fixed to a fixed face of a module with adhesive agent;
the opening portion is formed in the bottom plate;
the terminal portion is electrically connected to an external terminal at least partially disposed outside of the interior of the terminal box;
the external terminal and the terminal portion are connected to each other via the opening portion;
at least one of the fixed face and the bottom face includes an application area to which the adhesive agent is applied; and
a stepped portion is formed between the application area and a perimeter edge of the opening portion.

12. The terminal box fixing arrangement according to claim 11, wherein the stepped portion comprises a convex face portion formed on the bottom face and projecting therefrom.

13. The terminal box fixing arrangement according to claim 11, wherein the stepped portion comprises a concave face portion formed in the bottom face and formed concave relative thereto.

14. The terminal box fixing arrangement according to claim 11, wherein the terminal box includes a movable operational portion disposed in the interior of the terminal box that can be switched over between a contacting state for placing the terminal portion and the external terminal in contact with each other and a non-contacting state for keeping the terminal portion and the external terminal out of contact from each other.

15. The terminal box fixing arrangement according to claim 11, wherein the terminal portion can be connected to the external terminal with the terminal portion being brought into pressed contact with the external terminal in a position that faces the opening portion when the opening portion is aligned along the fixed face.

* * * * *